United States Patent [19]
Evans et al.

[11] Patent Number: 6,151,312
[45] Date of Patent: *Nov. 21, 2000

[54] NETWORK PROTOCOL FOR WIRELESS BROADBAND-ISDN USING ATM

[75] Inventors: Allan Evans, Sunnyvale; April Hunter, Los Altos; Charles Van Blaricom, Cupertino; Joel Williams, San Jose; Aki Shohara, Sunnyvale, all of Calif.

[73] Assignee: Stanford Telecommunications, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,212

[22] Filed: Feb. 12, 1996

[51] Int. Cl.$^7$ ........................................... E02F 3/14
[52] U.S. Cl. .................. 370/338; 370/337; 370/347; 370/349; 370/395; 370/469
[58] Field of Search .................................... 370/321, 322, 370/329, 337, 338, 341, 346, 347, 348, 395, 442, 443, 449, 458, 477, 503, 469; 455/450, 452, 509

[56] References Cited

U.S. PATENT DOCUMENTS

| | | | |
|---|---|---|---|
| 4,882,730 | 11/1989 | Shinmyo | 370/347 |
| 5,568,482 | 10/1996 | Li et al. | 370/395 |
| 5,638,371 | 6/1997 | Raychaudhuri et al. | 370/347 |

*Primary Examiner*—Ricky Ngo
*Attorney, Agent, or Firm*—Jim Zegeer

[57] ABSTRACT

A network protocol for the delivery of wireless broadband integrated services digital network (ISDN) using asynchronous transfer mode (ATM).

7 Claims, 12 Drawing Sheets

| OSI Reference Model | | Control Plane | Management Plane |
|---|---|---|---|
| Data Link Layer | ATM Adaptation Layer | | |
| | ATM Layer | | |
| Physical Layer | Transmission Convergence Layer | Medium Access Control | Timing Mgmt |
| | Physical Medium Dependent Layer | | Tx Power Mgmt |

| | | Control Plane | Management Plane |
|---|---|---|---|
| Data Link Layer | ATM Adaptation Layer | | |
| | ATM Layer | | |
| Physical Layer | Transmission Convergence Layer | Medium Access Control | Timing Mgmt |
| | Physical Medium Dependent Layer | | Tx Power Mgmt |
OSI Reference Model
FIG. 1
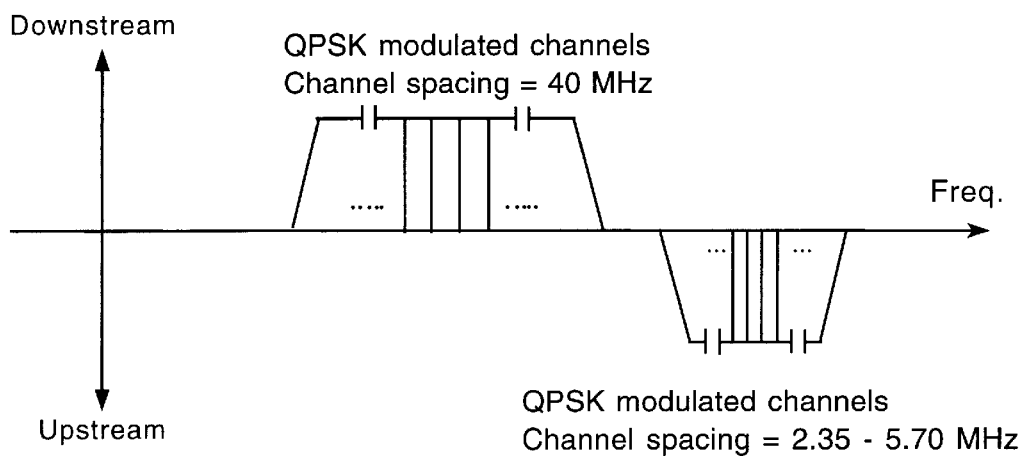
FIG. 2
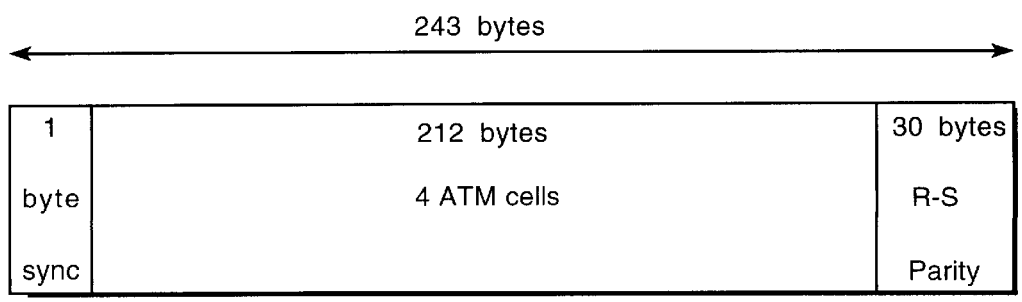
FIG. 3

NETWORK PROTOCOL FOR WIRELESS BROADBAND-ISDN USING ATM

1. The present invention relates to a network protocol for the delivery of wireless broadband integrated services digital network (ISDN) using asynchronous transfer mode (ATM)

2. BACKGROUND OF THE INVENTION

The recent allocation of frequencies by the FCC at 2.5 GHz and 28 GHz has enabled the delivery of broadband-ISDN services to residential and commercial users through wireless means. Broadband ISDN typically uses ATM as the link layer of the network protocol. ATM is a switch-oriented link protocol where each user has a dedicated connection to the switch and the switch manages bandwidth contention by multiple users by queues input cells until they can be delivered to the appropriate output. In a wireless point to multipoint system, the analog of the switch resides in a base station, and the link to the switch is a shared medium by all users whose access to that medium must be controlled. Therefore, for wireless point to multipoint systems there is the additional need for medium access control which is not required in ordinary ATM networks.

The medium access control requirements for wireless point to multipoint systems where the users are stationary are unique compared to other wireless networks such as wireless local area networks (LANs) as specified by the IEEE 802.11 standard. A wireless point to multipoint system can take advantage of the stationary nature of users enabling the use of highly directional antennas at the user stations. However, the base station will still employ broad beam antennas and will thus have multiple user transmissions received simultaneously. Medium access control will be necessary to ensure that mutual interference by multiple user transmission impinging on the base station antenna is eliminated.

There are numerous MAC protocols in currently in use by both wired and wireless standards. In Ethernet, where the cabling is a shared medium, carrier-sense multiple access is employed, which is essentially a listen before talk approach. In wireless LANs, such as that specified by the IEEE 802.11 standard, medium access control is also managed through carrier-sense multiple access. This is possible because portable user terminals will each typically have an omnidirectional antenna so that each user terminal can receive a transmissions from other users and ascertain whether the frequency channel is available. This is not possible with wireless point to multipoint systems where stationary users employ directional antennas, as they cannot receive transmissions from other users.

An additional complication in wide area wireless point to multipoint systems, is that the two way range differential between users close to the base station and those distant to the base station can be much larger than a modulation symbol.

The impetus for the invention is therefore to develop a networking protocol which provides bandwidth to users on an on-demand basis, which controls access by users to the shared wireless medium, which is bandwidth efficient, and which can be implemented with the minimum of hardware cost.

3. DESCRIPTION

3.1 Summary of the Invention

A networking protocol for wireless point (base station) to multipoint (user) networks where the users are stationary which utilizes time-division multiplexing the in the direction of the base station to the user, heretofore called the downstream direction, and time-division multiple access in the direction of the user to the base station, heretofore called the upstream direction, where medium access control actively assigns time slots in the upstream direction to accommodate varying demands for bandwidth by multiple users, where upstream frame timing is synchronized to the downstream frame timing, where time slots carry individual ATM cells, where the first time slot of the downstream frame carries a frame start ATM cell, where upstream time slot synchronization is maintained to within ±2 modulation symbols through timing control from the base station to the user, where random access time slots are used for control plane requests by users entering the network and users in standby mode seeking to begin a session, where polling is used for management plane functions and responses by users are on a polling response time slot.

3.2 Specific Features of the Invention

A networking protocol for wireless point (base station) to multipoint (user) networks. The with stationary users utilizing high gain directional antennas where:

1. Means for transmission convergence layer is provided through
   a) Time-division multiplexing is performed on an ATM cell basis in the direction of the base station to the user, heretofore called the downstream direction;
   b) Time-division multiple access on an ATM cell basis is used in the direction of the user to the base station, heretofore called the upstream direction;
   c) Upstream frame timing is synchronized to the downstream frame timing, where the first time slot of the downstream frame carries a Frame Start ATM cell which is an OAM cell identified by a unique reserved VPI/VCI;
   d) Frame periods in both the upstream and downstream directions are approximately but not greater than six milliseconds in length to allow delivery of voice traffic with minimum latency.
2. Means for physical medium dependent layer where
   a) The downstream is continuous-carrier with $\alpha=0.23$ root-raised cosine filtering, with QPSK or alternatively 16 QAM or 64 QAM modulation, using concatenated forward error correction coding consisting of a (243, 213, t=15) Reed-Solomon over GF(256) operating on four ATM cells and rate $7/8$ convolutional code.
   b) The upstream is burst-mode with $\alpha=0.23$ root raised cosine filtering, with QPSK or alternately 16 QAM modulation, using forward error correction of a (75, 53, t=11) Reed-Solomon code over GF(256).
   c) Time slots in the upstream direction have five preamble bytes, one ATM cell, and a one byte guard band;
3. Means for medium access control functions is provided through
   a) In-band signaling through ATM cells with reserved VPI/VCIs so that the requirements for acquisition, demodulation, and forward error correction are uniform across the data, control, and management planes of the network protocol;
   b) Transmission convergence layer medium access control which dynamically assigns time slots in the upstream direction to accommodate varying demands for bandwidth by multiple users;

c) Contiguous time slots at the beginning of the upstream frame are used for entry into the network by users whose two-way range timing has not been resolved to avoid mutual interference, where users entering the network remain on the net entry time slots until their timing is aligned by means described in claim 1;

d) Session requests are performed on a contention basis through contention time slots;

e) Carrying control plane acknowledgment of service requests in the payload of the frame start ATM cell in the downstream frame.

4. Means for management plane functions are provided through a) In-band signaling through ATM cells with reserved VPI/VCIs so that the requirements for acquisition, demodulation, and forward error correction are uniform across the data, control, and management planes of the network protocol;

b) Polling users by the base station, with uses responding on dedicated time slots in the upstream frame;

c) Carrying management plane polling requests in the payload of the frame start ATM cell in the downstream frame carries.

d) Upstream time slot synchronization is maintained to within ±2 modulation symbols through timing control from the base station to the user and through slaving the user transmit symbol clock to its received symbol clock in the transmission convergence layer.

e) Upstream power control is employed to ensure adequate received signal strength at the base station while minimizing adjacent cell interference.

5. Hardware and software means for implementing above claims in the base station including:

a) means for routing of in-band signaling ATM cells by the ATM switching device to and from the central processing unit;

b) means for measuring timing offsets by subscribers through counting periods of the reference symbol clock from a master frame epoch to the detection of the Barker sequence of the received transmission from the user;

c) means for measuring received signal level via bit error rate estimation for closed loop power control of the user transmitter;

6. Hardware and software means for implementing above claims in the user equipment including:

a) means for routing in-band signaling ATM cells to and from the ATM switching or segmentation and reassembly device to the user equipment central processing unit;

b) adjusting transmitter power based on received power level and power control commands via in-band signaling ATM cells from the base station;

c) means for slaving the transmit symbol clock reference to the received symbol clock reference d) means for adjusting the transmit symbol clock timing to minimize interference to other users.

7. Means for providing local area network (LAN) functionality through a proxy LAN Emulation client residing in the base station equipment which performs the necessary signaling and address resolution for the user equipment.

DESCRIPTION OF THE DRAWINGS

FIG. 1 shows the protocol stack for the invention according to the convention of the OSI Model, FIG. 2 is a conceptual illustration of LADS Spectrum Channelization, FIG. 3 illustrates the Reed Solomon error protected packet (R packet)

4. DESCRIPTION OF SPECIFIC EMBODIMENTS

Figure 4:
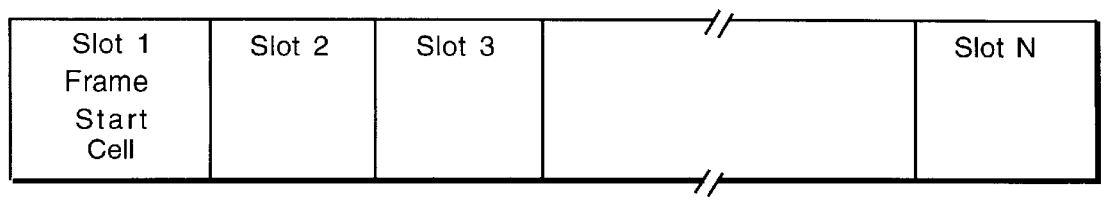
FIG. 4 illustrates the downstream frame structure.

It is well known that asynchronous transfer mode is the candidate network link protocol for broadband integrated services digital network (B-ISDN) which is typically defined as bit rates in excess of that of the primary rate interface ISDN (PRI-ISDN) of 1.544 Mbps. Physical layer standards have been developed or are being developed for using ATM over synchronous optical network (SONET) at rates of 155 and 622 Mbps, over category 3 twisted pair at 25 Mbps, and over category 5 twisted pair at 45 Mbps and 100 Mbps. In each of these cases, however, the network topology is switch-oriented where each user has a dedicated connection to an input port of the switch, and the switch buffers input cells until they can be routed to an output port of the switch. This is a classical star configuration.

In a wireless point to multipoint system, where the users each employ a narrowbeam antenna, and the switch resides in a centrally-located base station which employs a broad beam antenna, in which multiple users lie in its beam, the wireless medium becomes a shared medium. While the point to multipoint nature of the systems appears to be a star topology, because the wireless medium is shared, it is actually a bus or ring configuration. Hence, a medium access control protocol needs to be defined.

The network protocol stack is as shown in FIG. 1, and comprises the physical layer of the OSI Reference Model. Within the physical layer there is the physical medium dependent layer which involves the modulation, forward error correction, and filtering of the signal that is transmitted over the wireless medium. The transmission convergence layer comprises time-multiple access, the frame structure, and the time slot structure within each frame.

The control plane functions at the transmission convergence layer include those functions necessary for controlling access to the wireless medium through assignment of time slots. This function must interface to higher level control plane functions such as the ITU Q.2931 signaling standard, the ATM Forum User Network Interface, and LAN Emulation clients.

The management plane functions at the transmission convergence layer involve timing control to minimize guard band times between time slots. At the physical layer, the management functions involve controlling the user transmitter power to ensure an adequate received signal level at the base station but not too strong as to cause adjacent cell interference, where cell refers to a cell in a cellular distribution system, not an ATM cell. Additionally, the management plane functions include controlling the user's transmit frequency so that it does not interfere with users on adjacent frequency channels, which is described in detail in a separate patent application.

This Physical Layer Interface supports bidirectional transmission over millimeter radio wave. This Interface is a point-to-multipoint TDM broadcast from Access Node to STB, and point-to-point upstream TDMA link from STB to Access Node. This Physical Layer interface specifies the complete physical layer structure of the bidirectional carriage of S1, S2, S3, S4, and S5 information.

The spectrum allocations for downstream and upstream transmissions depend on the LMDS region and this Physical Interface specification applies for the case of frequency division duplexing as illustrated by the example in FIG. 2. The allocated downstream spectrum shall be partitioned into frequency channels of specified spacing, and the downstream data shall have the specified TDM framing structure, i.e., a contiguous stream of data packets that are encoded carried on a continuous carrier RF waveform by QPSK modulation.

The allocated upstream spectrum shall be partitioned into frequency channels of specified spacing, and the channels shall have the specified TDMA framing structure. The upstream transmissions from the STB shall be contained in RF packets, i.e., bursts of data transmissions, where the timing of packet transmissions defined by the slots of the TDMA frame. The upstream TDMA frame and downstream TDM frame shall have equal frame lengths of 5.742 milliseconds. At the Access Node, the upstream frame epochs have a configured delay relative to the downstream frame start epochs. All STBs shall synchronize their upstream packet transmission times so that packets arrive at the Access Node in assigned slots to within a specified accuracy. The requisite upstream synchronization accuracy shall be achieved with the aid of Access Node feedback of measured synchronization error to STBs.

The parts of the ATM protocol stack addressed in this Physical Interface specification are described. The ATM transmission convergence sublayer comprises time-multiple access, the frame structure, and the time slot structure within each frame. The physical medium dependent sublayer pertains to modulation, forward error correction, and filtering of signals transmitted over the wireless medium. The Transmission Convergence Sublayer and Physical Dependent Sublayer are described in 4.1 for the downstream, and 4.2 for the upstream.

The control plane specifications at the transmission convergence layer include those functions necessary for controlling access to the wireless medium through assignment of time slots and are covered in Sec. 7.13.3. This function must interface to higher level control plane functions such as the ITU Q.2931 signaling standard.

The management plane specifications at the transmission convergence sublayer include Access Node control of timing for STB upstream packet transmissions to achieve alignment of received packets with the upstream frame at the Access Node. At the physical layer, the management plane specifications include Access Node control of STB transmission frequency and STB transmitter power levels.

4.1 Downstream LMDS

4.1.1 Transmission Convergence Layer

A slot is defined as a time interval required to send a single ATM cell. For the downstream, ATM cells are grouped in fours to form a Reed Solomon error protected code word (RS packet) as illustrated in FIG. 3. Thus, the RS packet consists of a group of four ATM cells preceded by a 1-byte sync prefix and followed by 30 bytes of parity. The 30 bytes of parity in the RS packet provide for a Reed-Solomon RS (243,213) code with a t=15 byes of error correction capability per RS packet. Note that the time slot construction is merely a convenience for packing ATM cells onto a GF(256) Reed-Solomon codebook. The time-division multiplexing is performed on an ATM cell basis so that cells corresponding to different subscribers may be packed into the same RS packet.

The downstream TDM frame contains N=700 slots (N may be increased with alternative modulation rates - - - see Table 2). The first slot of the downstream frame (first ATM cell of the first RS packet) shall contain a Frame Start ATM cell. This Frame Start ATM cell shall be assigned a reserved VPI/VCI header with the Payload type set as an OAM cell. When the STB processing reads the reserved VPI/VCI, a downstream frame start epoch shall be generated, and the STB shall use the epoch to estimate upstream frame timing.

The 48 byte payload of the frame start cell shall contain control and management data.

4.1.2 Physical Medium Dependent Sublayer

Figure 5:
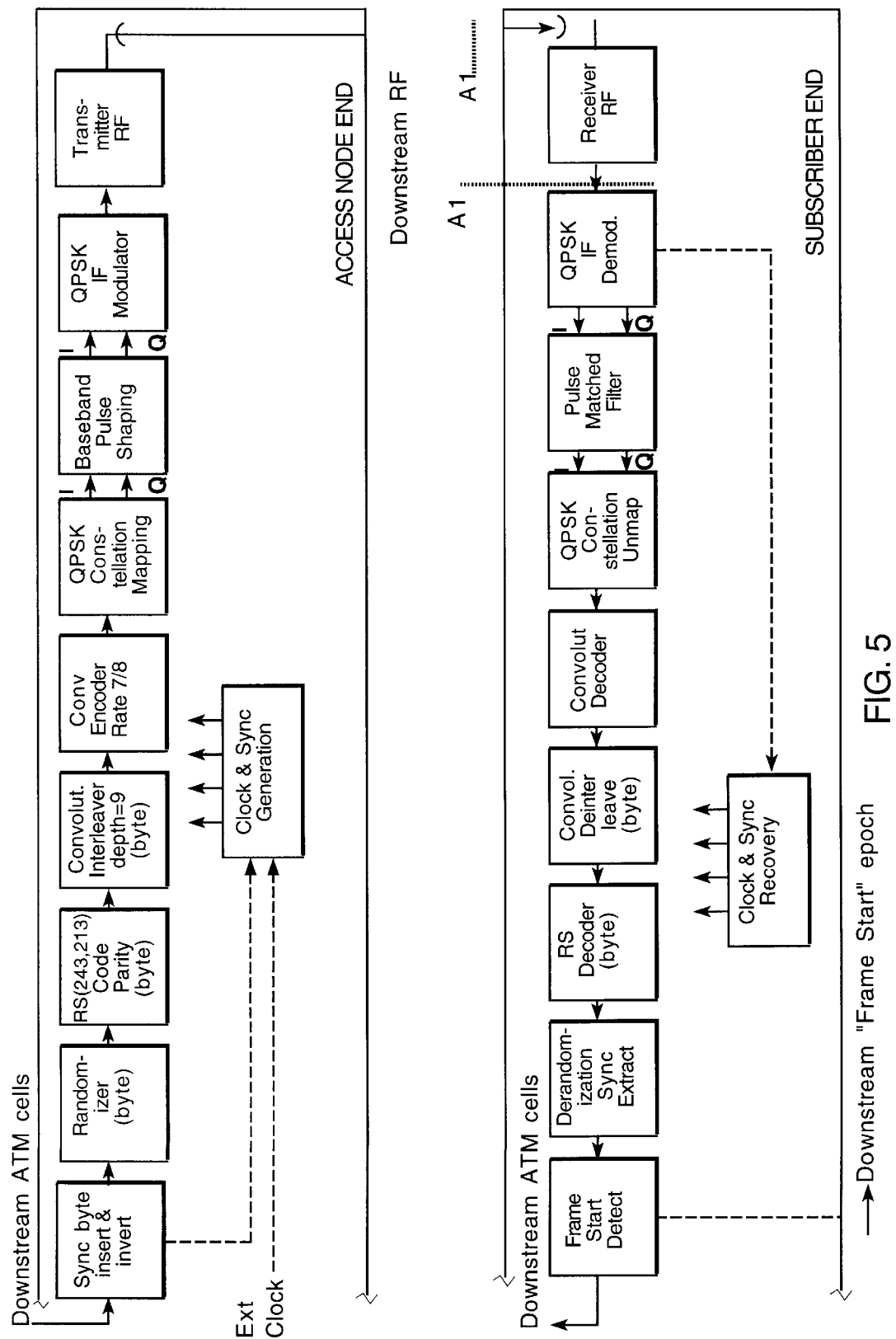
FIG. 5 illustrates an embodiment of the downstream encoding and modulation.
Figure 6A:
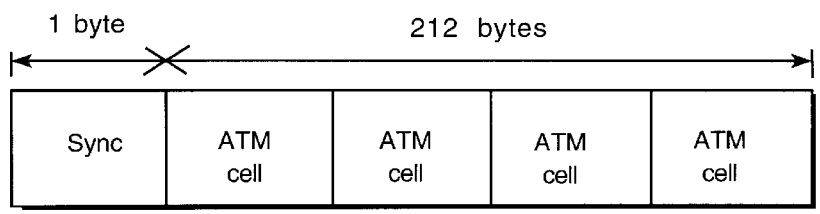
FIG. 6 illustrates the downstream data randomization, Reed Solomon encoding, and interleaving.
Figure 6B:
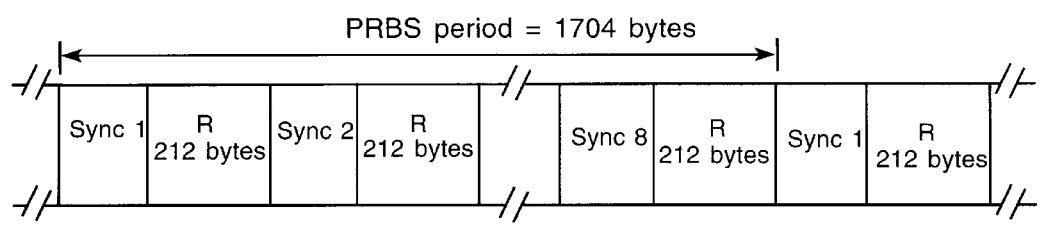
Figure 6C:
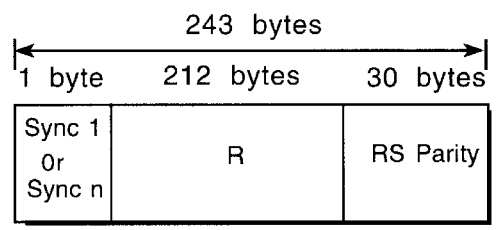
Figure 6D:
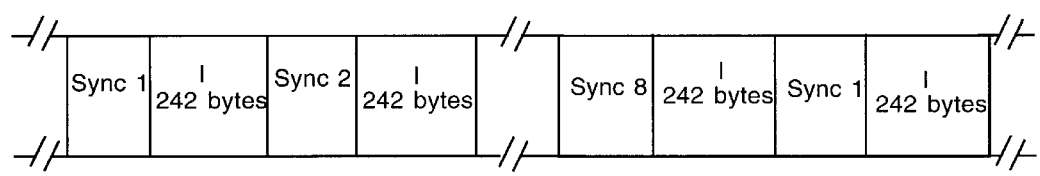

The coding and modulation of the downstream carrier waveform is summarized in the block diagram in FIG. 5. The evolution of the format of the downstream data stream as it is encoded at the Access Node end is illustrated in FIG. 6. ATM cells from the Transmission Convergence Layer are grouped in fours and a sync byte appended to each group, as illustrated in FIG. 6a. Every eighth sync byte shall be inverted. The stream of uncoded data packets, excepting sync bytes, shall be randomized for spectral shaping by exclusive-or with a pseudorandom bit stream (PBRS). The randomizer shall be reinitialized at occurrence of each inverted sync byte in the data stream which implies an effective PRBS period of 8 RS packets or 1504 bytes (FIG. 6b). Each data packet in the randomized stream of uncoded data packets, including its sync preamble, shall be encoded by the specified Reed Solomon RS (243, 213) block code, where the code symbol is an eight-bit byte (FIG. 6c). The byte stream of Reed-Solomon encoded byte symbols shall be interleaved by a convolutional byte interleaver using the Forney method with an interleave depth of 9 bytes. The convolutional interleaver commutators shall be synchronized to the occurrence of sync bytes so that sync bytes are not permuted by the interleaver (FIG. 6d).

The byte interleaved downstream data shall be convolutionally encoded by the specified rate ⅞ punctured convolutional code.

Successive bit pairs of the convolutionally encoded data shall be directly mapped into inphase (I)/quadrature (Q) components of QPSK symbol symbols by Gray coding.

The baseband I/Q phases shall be shaped by root-raised cosine filters with an excess bandwidth factored of $\alpha=0.23$.

The QPSK IF modulator shall modulate the shaped QPSK symbol onto an IF carrier.

The transmitter shall upconvert and transmit the QPSK modulated waveform at the channel frequency over the Physical Interface.

At the subscriber end, the preceding waveform encoding and modulation steps at the Access Node are reversed (FIG. 5). After the received data stream has been decoded and derandomized, the ATM data stream shall be searched for the specified start frame preamble in the first ATM cell of a frame. A downstream "frame start" epoch shall be generated when the start frame preamble is detected in the data stream. The derandomized stream of uncoded packets shall be passed to the transmission convergence sublayer.

4.1.3 Channel Coding

In order to minimize power amplifier output requirements at the subscriber end, concatenated coding of an outer Reed Solomon code and an inner convolutional code shall be employed. A convolutional interleaver shall be employed between the Reed Solomon encoder and convolutional encoder in order to disperse byte error bursts at the output of the convolutional decoder.

4.1.3.1 Randomization for Spectrum Shaping

Randomization shall be employed to minimize the possibility of transmission of an unmodulated carrier and to ensure adequate numbers of bit transitions to support clock recovery.

Figure 7:
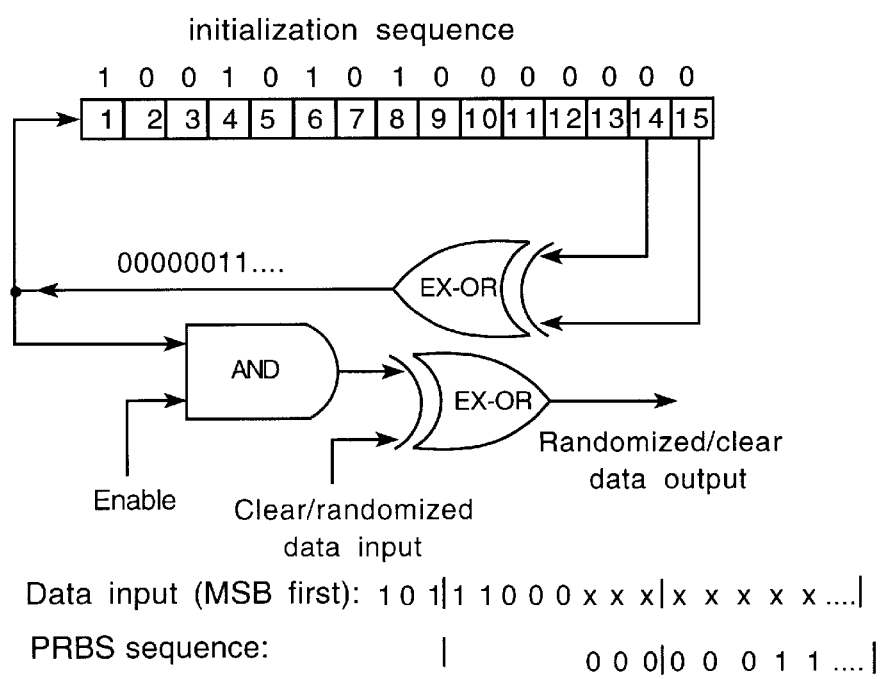
FIG. 7 illustrates the randomizer logic diagram.

The stream of uncoded downstream packets (FIG. 6a), excluding sync bytes, shall be randomized by modulo-2 addition of the data with the output of the pseudo random binary stream (PBRS) generator, as illustrated in FIG. 7. The PBRS shall be initialized at each inverted sync byte by the sequence 100101010000000 in the manner depicted in the figure. The sync byte (hex 47H) shall be inverted (hex B8H) every eight packets, starting at the beginning of the frame. The generator polynomial for the PRBS shall be:

$1+X^{14}+X^{15}$

Following initialization, the first PRBS generator output bit shall be added to the first bit following the inverted sync bit. Over subsequent sync bytes, the PBRS generator shall continue to step its internal shift register state but the PBRS output addition to the sync byte bits shall be disabled. Thus, the period of the PRBS sequence shall be 1504 bytes, as illustrated in FIG. 6b.

4.1.3.2 Reed Solomon Coding

Block coding shall be applied to each randomized packet including the sync prefix FIG. 6c. The code shall be a systematic shortened RS(243,213, T=15) code with code generator polynomials given by Code Generator Polynomial: $g(x)=(x+\mu^0)(x+\mu^1)(x+\mu^2)\ldots(x+\mu^{15})$, where $\mu$=02 hex Field Generator Polynomial: $p(x)=x^8+x^4+x^3+x^2+1$ The specified code has a block length of 255 bytes, and the shortened code may be obtained by preceding the information input bits with zero bytes. The resultant code will correct T=15 byte errors in each code word.

4.1.3.3 Convolutional Interleaving

Figure 8:
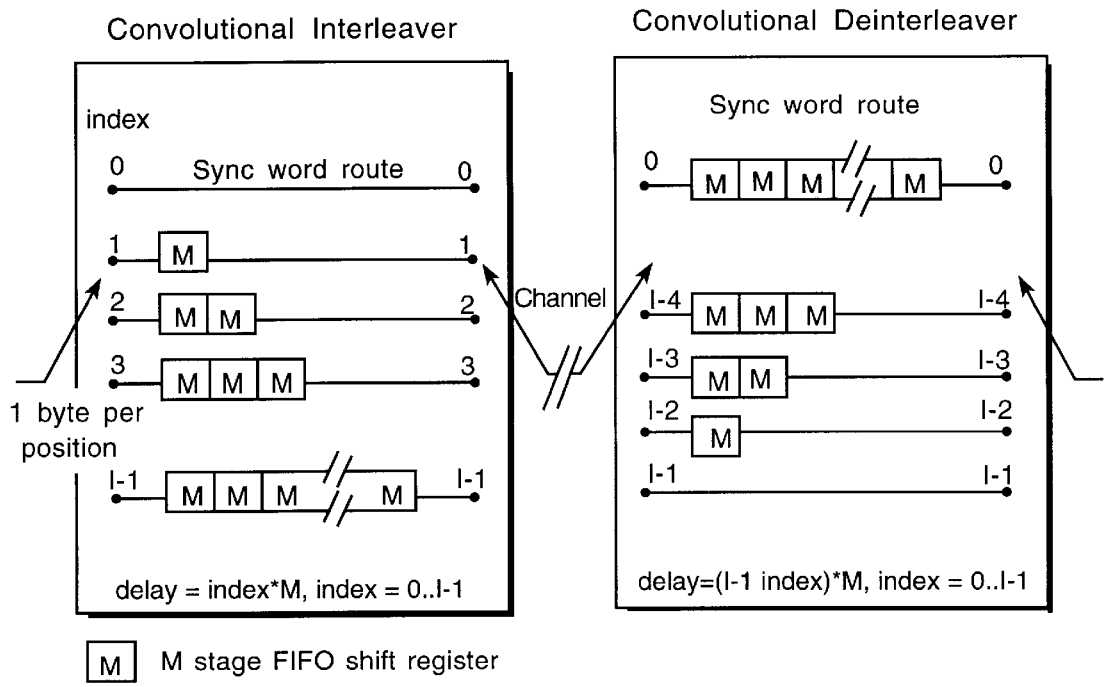
FIG. 8 is a diagram of the Forney interleaving method.

The convolutional interleaving and deinterleaving shall operate in accordance with the Forney method depicted in FIG. 8. The interleaver has a total of J branches, and the commutator points to the j-th branch, j=0, 1, ..., J−1, and rotates one branch count for each successive input byte. The j-th branch contains a shift register of length j×M bytes and the register contents are shifted one byte per commentator visit. The parameter value M=N/J and N=243 is the specified Reed-Solomon code block length, and J=9 is the specified interleaver depth. The interleaver commutator is synchronized with the arrival of sync bytes such that sync bytes always traverse the uppermost branch j=0 of the interleaver. The deinterleaver commutator is initially synchronized to the interleaver commutator by temporarily pausing at the j=0 position until a sync byte is received.

4.1.3.4 Convolutional Coding

The convolutional code shall be the rate ⅞ code obtained by puncturing of the rate ½ contraint length K=7 code having the following generator vectors g, and puncturing patterns P (0 denotes punctured (deleted) bit:

Code generators: $g1 = 171oct$ $g2 = 133oct$

Puncture pattern: $P1 = 1000101$ $P2 = 1111010$

4.1.3.5 Modulation

TABLE 1

Specifications for QPSK Modulation (Downstream)

| | |
|---|---|
| Modulation | QPSK |
| Signal Constellation | Gray coded direct mapping (no differential encoding) of (I,Q) from bit pairs of convolutional decoder output as follows: |

| 01 | 11 |
|---|---|
| x | x |
| x | x |
| 00 | 10 |

| | |
|---|---|
| Transmission Rate | 32.5 Mbaud |
| Transmit Filtering | Root raised cosine filtering, rolloff factor $\alpha = 0.23$ |
| Channel Spacing | 40.0 MHz |
| Frequency Range | Region Dependent |
| Frequency Error | 5 MHz |
| Phase Noise | The phase noise shall not exceed the following levels |

| Freq offset [kHz] | Level [dBc/Hz] |
|---|---|
| 1 | −55 |
| 10 | −85 |
| 50 | −106 |
| 100 | −109 |
| 500 | −116 |
| 1000 | −122 |
| 2000 | −128 |

| | | |
|---|---|---|
| Transmit Spectral Mask | BW | Response |
| | (TBD) | |
| Carrier Suppression | >30 dB | |
| I/Q Amplitude Imbalance | <1 dB | |
| I/Q Phase Imbalance | <2.0 degrees | |

4.1.3.6 Baseband Pulse Shaping

Prior to modulation, the I and Q signals shall be filtered by square-root raised cosine filter. The excess bandwidth factor α shall be 0.23. The square-root raised cosine filter is defined by the following transfer function II:

$$\begin{cases} H(f) = 1 & \text{for } |f| < f_N(1-\alpha) \\ H(f) = \left\{\dfrac{1}{2} + \dfrac{1}{2}\sin\dfrac{\pi}{2f_N}\left[\dfrac{f_N - |f|}{\alpha}\right]\right\}^{1/2} & \text{for } f_N(1-\alpha) \le |f| \le f_N(1+\alpha) \\ H(f) = 0 & \text{for } |f| > f_N(1+\alpha) \end{cases}$$

where $$f_N = \frac{2}{2T_N} = \frac{R_N}{2}$$

is the Nyquist frequency and excess bandwidth factor α=0.23.

4.1.4 Information Bit Rate and Slots Per Frame

Table 2 summarizes downstream information rates for the specified QPSK modulation. The inclusion of 16 QAM is informative for DAVIC 1.0 and may be used for subscribers that employ premium equipment having higher transmitter outputs, or have an advantaged line of sight path to the base station.

TABLE 2

Downstream Physical Medium Dependent Parameters

| Status | Units | Normative | Informative | Informative | Informative |
|---|---|---|---|---|---|
| Frame Period | ms | 5.742 | 5.742 | 5.742 | 5.742 |
| Time Slots per Frame | | 672 | 672 | 1344 | 2016 |
| ATM Cell Rate | cells/s | 117027 | 117027 | 234053 | 351080 |
| ATM Rate | Mbps | 49.619 | 49.819 | 99.239 | 148.858 |
| Time Slot Efficiency | | 212/213 | 212/213 | 212/213 | 212/213 |
| Bit Rate | Mbps | 49.8534 | 49.8534 | 99.7068 | 149.5602 |
| Reed Solomon Efficiency | | 71/81 | 71/81 | 71/81 | 71/81 |
| Convolutional Code Effic. | | 7/8 | 7/8 | 7/8 | 7/8 |
| Coded Symbol Rate | Msps | 65.0000 | 65.0000 | 130.0000 | 195.0000 |
| Modulation | bps/baud | 2 | 4 | 4 | 6 |
| Channel Symbol Rate | Mbaud | 32.5000 | 16.2500 | 32.5000 | 32.5000 |
| Excess Bandwidth | Hz/Baud | 1.2300 | 1.2300 | 1.2300 | 1.2300 |
| Channel Bandwidth | MHz | 39.9750 | 19.9875 | 39.9750 | 39.9750 |

4.1.5 The IF Interface (A1*)

The location of the downstream A1* Physical Interface is an intermediate frequency (IF) interface and separates at the subscriber end the outdoors RF and IF equipment contained in the NT from the IF and baseband equipment contained in the NIU. Specifications of the A1* Interface downstream are shown in Table 3.

TABLE 3

Specifications for the A1* Physical Interface (Downstream)

| | |
|---|---|
| Downstream Frequency | 950 to 1800 MHz |
| Downstream signal level | −60 to −30 dBm |
| Phase Noise | The phase noise shall not exceed the following levels: |
| | Freq offset [kHz]  Level [dBc/Hz] |
| | 1  −51 |
| | 10  −81 |
| | 50  −102 |
| | 100  −106 |

TABLE 3-continued

Specifications for the A1* Physical Interface (Downstream)

| | |
|---|---|
| | 500  −115 |
| | 1000  −121 |
| | 2000  −127 |
| Frequency Error | ≦5 MHz |
| DC power | 24 VDC @ 1 amp. |

4.2 Upstream LMDS

The upstream TDMA frame length is equal to the downstream TDM frame length at 5.742 milliseconds. At the Access Node upstream receiver, the upstream frame shall have a fixed delay relative to the downstream frame. The STB shall adjust timing of upstream packet transmissions to coincide with the upstream frame slot boundaries at the Access Node receiver, i.e., the STB shall achieve upstream symbol synchrony (with the Access Node receiver) to a specified level of accuracy. There are two levels of upstream synchronization: (1) before net entry and (2) after net entry.

The maximum synchronization error before net entry is determined primarily by the STB uncertainty of two-way propagation delay, and the maximum uncertainty is determined by LMDS service cell radius. For STB net entry, Net management shall allocate multiple contiguous slots as needed to form longer net entry slots such that TDMA packet collisions caused by STB net entry transmissions are precluded. The net entry procedure shall provide for synchronization pullin wherein the STB adjusts upstream timebase in response to feedback of synchronization error estimated by the Access Node. After net entry the STB upstream synchronization shall error shall be maintained at less than one upstream symbol in length (packet guard time is 4 symbols). The Access Node shall provide periodic feedback of estimated upstream synchronization error to assist the STB in maintaining the specified synchronization accuracy after net entry.

4.2.1 Transmission Convergence Layer

Figure 9:
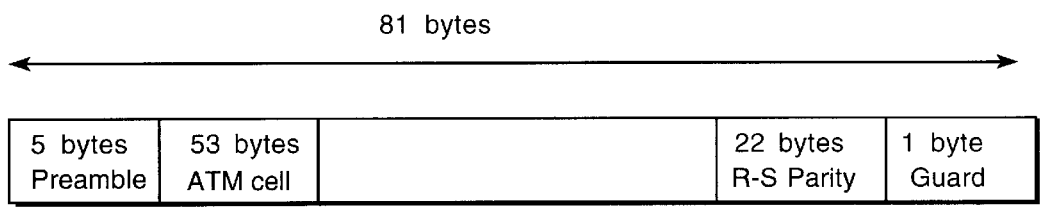
FIG. 9 illustrates the upstream slot structure.
Figure 10:
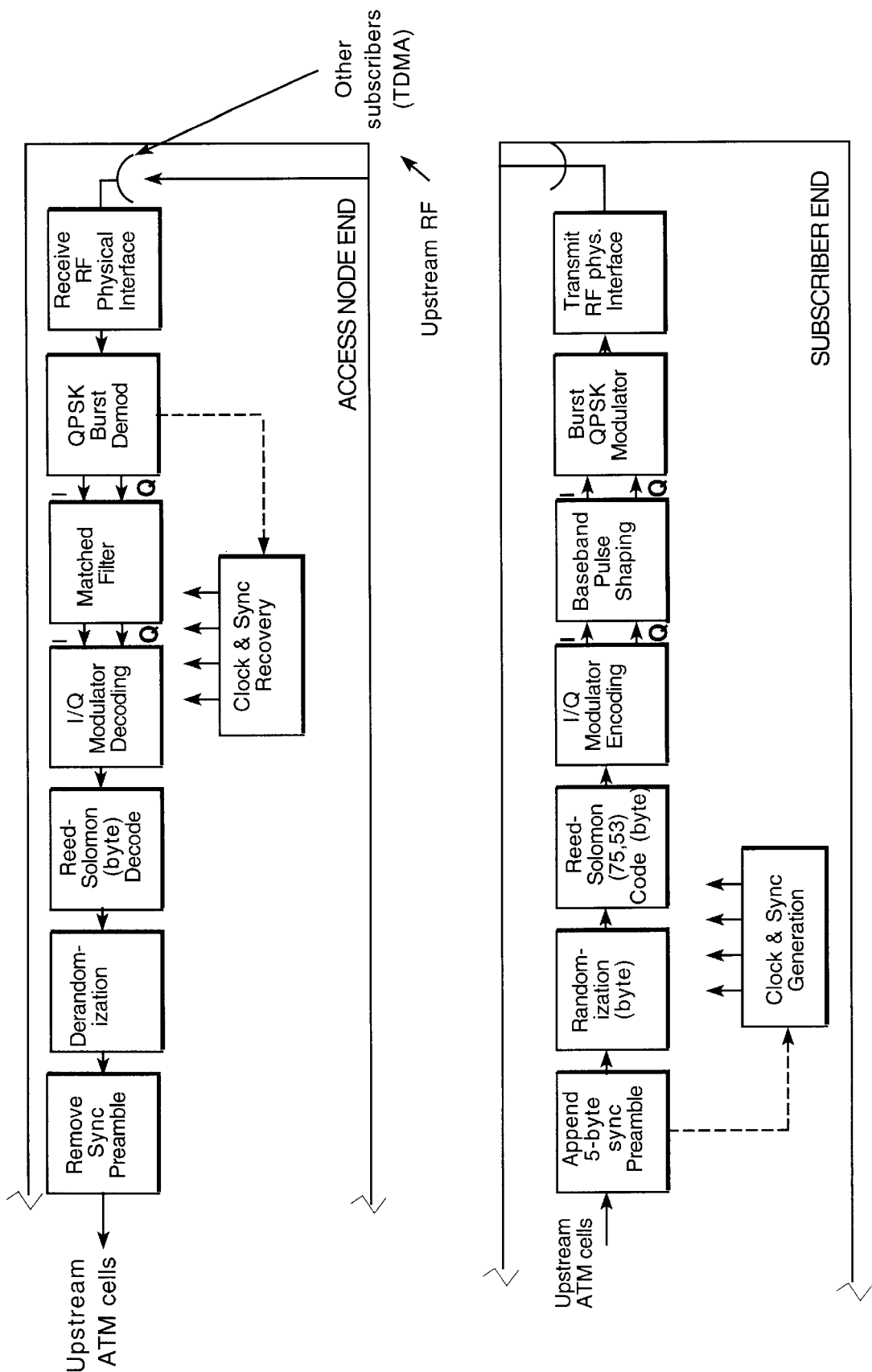
FIG. 10 illustrates the upstream data flow.

The specified upstream time slot structure is shown in FIG. 9. A slot if 81 bytes long, consisting of a sync preamble, one ATM cell, 22 Reed Solomon check bytes, and 1 byte of guard time for upstream synchronization error. At the QPSK modulator input before Gray scale mapping, the preamble consisting of the Barker sequence followed by zero pad bits is expressible as FFC3CCC000.

The one-byte guard time provides for upstream synchronization error after net entry. The preamble supports pull-in of upstream timing during net entry, as well as measurement of upstream timing error to support maintenance of upstream synchronization after net entry.

The upstream frame consists of F slots where F depends on the upstream modulation rate used. The F slots of a frame are partitioned into polling slots, contention slots, and traffic slots. The relative number of these three types of slots are dynamic at the discretion of the slot assignment functions, under the constraint that their total is F.

4.2.2 Physical Dependent Layer

The coding and modulation of upstream packets is summarized in the block diagram of FIG. 1.

The upstream ATM cell received from the transmission convergence layer shall be randomized for spectral shaping with a randomizer, and the randomized ATM cell shall be encoded for forward error correction by a Reed Solomon RS (75, 53) code with 8-bit code symbols. The 5-byte sync preamble shall be appended to the ATM cell and the resultant coded packet is mapped into I/Q baseband pulses to effect differentially encoded QPSK. The baseband modulation pulses shall be filtered with root-raised cosine filters having an excess bandwidth factor of $\alpha=0.30$ and the packet data shall be burst modulated onto the upstream RF waveform into an assigned slot.

The preceding operations at the subscriber node for upstream transmission shall be reversed at the Access Node end for reception of upstream burst transmissions.

4.2.2.1 Randomization for Spectrum Shaping

For the upstream packet, only the ATM cell of the packet shall be randomized. The randomizer shall be the linear feedback shift register (LFSR) with generating polynomial $x^6+x^5+1$. The initial contents of the register shall be all ones, and the LFSR shall be reset to initial condition at the beginning of each ATM cell. At the Access Node the complementary self-synchronizing feed-forward linear shift register derandomizer shall be used.

4.2.2.2 Reed-Solomon Coding

Reed Solomon coding shall be applied to each randomized ATM cell. The code shall be the shortened systematic Reed-Solomon code RS(75, 53, T=11). The specified code generator polynomials are given by Code Generator Polynomial: $g(x)=(x+\mu^0)(x+\mu^1)(x+\mu^2)\ldots(x+\mu^{15})$, where $\mu=02$ hex Field Generator Polynomials: $p(x)=x^8+x^4+x^3+x^2+1$ The specified code has a block length of 255 bytes, and shall be configured as a RS (255, 233, T=11) code with information bits preceded by 158 zero symbols. The resultant code will correct T=11 byte errors in each code word.

4.2.2.3 Modulation

TABLE 4

Specifications for QPSK Modulation (Upstream)

| | |
|---|---|
| Modulation | Differentially encoded QPSK |
| Differential Encoding | The differential encoder shall accept bits A,B in sequence and generate phase changes as follows: |

TABLE 4-continued

Specifications for QPSK Modulation (Upstream)

| | |
|---|---|
| Modulation | Differentially encoded QPSK |

| A | B | Phase Change |
|---|---|---|
| 0 | 0 | none |
| 0 | 1 | +90 degrees |
| 1 | 0 | 180 degrees |
| 1 | 1 | −90 degrees |

| | |
|---|---|
| Signal Constellation | 01 \| 11<br>x \| x<br>x \| x<br>00 \| 10 |
| Transmission Rates | 1.8056, 2.7803, 3.6111, 4.0625 Mbaud |
| Transmit Filtering | Root raised cosine filtering, rolloff factor $\alpha = 0.30$ |
| Channel Spacing | Variable, 2.35 MHz to 5.7 MHz |
| Data Randomization | Data shall be randomized by input of ATM cell into linear feedback shift register (LFSR) with generator polynomial $x^6 + x^5 + 1$. Sync bytes shall not be randomized, and the LFSR shall be initialized at the beginning of each ATM cell. |
| Frequency Range | Region Dependent |
| Frequency Resolution | $\leq$500 Hz |
| Phase Noise | The phase noise shall not exceed the following levels: |

| Freq Offset [kHz] | Level [dBc/Hz] |
|---|---|
| 1 | −50 |
| 10 | −78 |
| 50 | −100 |
| 100 | −106 |
| 500 | −112 |
| 1000 | −123 |
| 2000 | −123 |

| | | |
|---|---|---|
| Transmit Spectral Mask | BW | Response |
| | (TBD) | |
| Carrier Suppression | >30 dB | |
| I/Q Amplitude Imbalance | <1 dB | |
| I/Q Phase Imbalance | <2.0 degrees | |
| C/N at the demodulator input (Nyquist bandwidth) | TBD | |

4.2.2.4 Information Bit Rate and Slots Per Frame

Table 5 summarizes upstream QPSK modulation rates. For each modulation rate, associated information rate and number of slots per frame are indicated. The high rate upstream parameters in Table 6 are informative for DAVIC 1.0.

TABLE 5

Low Rate Upstream Physical Medium Dependent Layer Parameters
(Normative)

| Description | Units | $R_{sd}/R_{su}$ 18 | 16 | 12 | 9 | 8 |
|---|---|---|---|---|---|---|
| Frame Period | ms | 5.742 | 5.742 | 5.742 | 5.742 | 5.742 |
| Time Slots per Frame | | 32 | 36 | 48 | 64 | 72 |
| ATM Cell Rate | cells/s | 5573 | 6269 | 8359 | 11145 | 12539 |
| ATM Rate | Mbps | 2.363 | 2.658 | 3.544 | 4.726 | 5.316 |
| Time Slot Efficiency | | 25/27 | 25/27 | 25/27 | 25/27 | 25/27 |
| Bit Rate | Mbps | 2.5519 | 2.8708 | 3.8278 | 5.1037 | 5.7417 |
| Reed Solomon Efficiency | | 53/75 | 53/75 | 53/75 | 53/75 | 53/75 |
| Coded Symbol Rate | Msps | 3.6111 | 4.0625 | 5.4167 | 7.2222 | 8.1250 |
| QPSK Modulation | | 2 | 2 | 2 | 2 | 2 |
| Channel Symbol Rate | Mbaud | 1.8056 | 2.0313 | 2.7083 | 3.6111 | 4.0625 |
| Excess Bandwidth | Hz/Baud | 1.3000 | 1.3000 | 1.3000 | 1.3000 | 1.3000 |
| Channel Bandwidth | MHz | 2.3472 | 2.6406 | 3.5208 | 4.6944 | 5.2813 |

TABLE 6

High Rate Upstream Physical Medium Dependent Layer Parameters
(Informative)

| Description | Units | $R_{sd}/R_{su}$ 6 | 4 | 3 | 2 |
|---|---|---|---|---|---|
| Frame Period | ms | 5.742 | 5.742 | 5.742 | 5.742 |
| Time Slots per Frame | | 96 | 144 | 192 | 288 |
| ATM Cell Rate | cells/s | 16718 | 25077 | 33436 | 50154 |
| ATM Rate | Mbps | 7.088 | 10.633 | 14.177 | 21.265 |
| Time Slot Efficiency | | 25/27 | 25/27 | 25/27 | 25/27 |
| Bit Rate | Mbps | 7.6556 | 11.4833 | 15.3111 | 22.9667 |
| Reed Solomon Efficiency | | 53/75 | 53/75 | 53/75 | 53/75 |
| Coded Symbol Rate | Msps | 10.8333 | 16.2500 | 21.6667 | 32.5000 |
| QPSK Modulation | | 2 | 2 | 2 | 2 |
| Channel Symbol Rate | Mbaud | 5.4167 | 8.1250 | 10.8333 | 16.2500 |
| Excess Bandwidth | Hz/Baud | 1.3000 | 1.3000 | 1.3000 | 1.3000 |
| Channel Bandwidth | MHz | 7.0417 | 10.5625 | 14.0833 | 21.1250 |

4.2.3 Specifications for the IF Interface (A1*)

The location of the downstream A1* Physical Interface is an intermediate frequency (IF) interface the separates at the subscriber end the outdoors RF and IF equipment contained in the NT from the IF and baseband equipment contained in the NIU. Specifications for the A1* Interface upstream is shown in Table 7.

TABLE 7

Specifications for the A1* Physical Interface (Upstream)

| | |
|---|---|
| Upstream Frequency | 300 to 425 MHz |
| Uptream signal level | −40 to −10 dBm |
| Phase Noise | The phase noise shall not exceed the following levels: |
| | Freq offset [kHz]   Level [dBc/Hz] |
| | 1      −55 |
| | 10     −82 |
| | 50     −103 |
| | 100    −109 |
| | 500    −120 |
| | 1000   −126 |
| | 2000   −126 |
| Frequency Resolution | ≦500 Hz |
| DC power | 24 VDC @ 1 amps |

4.3 MAC Protocols and Scenarios

4.3.1 Introduction

This document describes the messages for establishing, maintaining, and managing the physical wireless media for communication between an AIU and an NIU. Examples of scenarios such as an NIU entering the network or requesting more resources are given. The exact sequence of a scenario is flexible in many cases, and, thus the examples given are only examples and are not to be interpreted as the only possible sequence for the given scenario. The messages, however, are not just examples but are an exact specification of the messages between the AIU and NIU across the A1 interface that may be transmitted as the MAC flow. Higher layer flows are not addressed here. Only the messages for set-up of the connections for carrying those higher layer flows are defined here. The MAC flow is bi-directional supported by modems at the AIU and NIU. Messages may be sent downstream to the NIU or upstream to the AIU. Both the downstream and upstream are divided into time slots that encapsulate exactly one ATM cell. The modulators at the AIU transmit one or more downstream frequency channels. However, only one downstream frequency channel may be received by the NIU at any instance. The NIU may switch to a different downstream frequency channel, but this switch may require time on the order of many time slots. Likewise, the NIU is only capable of transmitting on one upstream frequency channel at an instance in time. However, the NIU may be capable of transmitting on one frequency channel for one time slot and transmit on a different frequency channel for the following time slot.

message. The poll_request and poll_feedback portions in the frame start time slot are referred to as FS.P. After the poll_feedback, the AIU may fill the remaining bytes of the frame start OAM cell with any MAC message.

| frame_start( ) - OAM Cell | [FS] | Bits | Bytes | Bit Number/Description |
|---|---|---|---|---|
| {  |  |  |  |  |
|   poll_request | [FS.P] |  | ~<20 | Status Request |
|   poll_feedback | [FS.P] |  | ~<10 | Upstream Tx Calibration/ Serial Number |
|   message_field | [FS.M] | ~14 |  |  |
| } |  |  |  |  |

4.3.2 Time Slot Types

The downstream scheme is time division multiplex and the time slot types are divided into frame start slots and random access slots. The upstream scheme is time division multiple access and the time slot types are divided into polling response slots, contention slots, and reserved time slots. The control and management messages, including the MAC messages defined here, sent across A1 between the AIU CPU and the NIU/STB CPU must be single cell OAM messages. Note that the OAM cell has a 45-byte available payload. The AIU shall not send more than 50 OAM cells per seconds, including management cells, to the NIU in order set a limit on the amount of processing required by the NIU/STB. The poll [P] and contention [C] time slots sent from the NIU only contain control messages, and, thus, are only OAN cells. Reserved time slots sent from the NIU carry AAL5 or AAL1, for voice data. ATM cells and OAM control message cells. Since the random access time slots downstream and the reserved time slots upstream shall transport higher layer data over an AAL5 or AAL1 virtual connection, these time slots are referenced as [VC].

4.3.2.1 Acronyms

FS: Frame Start Time Slot
FS.P: Poll Request or Poll Feedback in the Frame Start Time slot
C: Contention Time Slot
P: Poll Response Time Slot
VC: Virtual Connection (Asynchronous)

4.3.2.2 Downstream Time slots

Frame Start Time slot

The frame start time slot [FS] always occurs on the first time slot in the downstream frame in order that the NIU may determine the beginning of the downstream frame and synchronize its upstream frame to it. This time slot always encapsulates one frame start OAM cell referenced as FS. The first message in the frame start payload is always interpreted by the NIU as a polling request to which it must respond. The niu_id field in the message identifies which NIU is being polled. The first message is not required to request information from the NIU but the NIU must transmit on the next polling response time slot that was assigned to it. Often, one of the polling request messages is a status_request message. Following the polling request messages, the AIU typically sends a feedback message providing feedback to the NIU that is designated by the niu_id in the

4.3.2.3 Random Access Time Slots

The random access slots [VC] are all the time slots in the downstream frame except that frame start time slot. This is all the downstream time slots except the first time slot in the frame. The AIU may transmit on any of these time slots whenever it has any cells that need to be transmitted to an NIU. The cells may be OAM cells or part of and adaptation layer packet, e.g. AAL5. The random access slots are reference by the symbol VC because they are utilized in a more true ATM sense rather than being synchronous or semi-synchronous due to physical layer constraints because these are the only downstream time slots on which higher layer cells may be transmitted on a virtual connection.
Downstream Frame The following figure illustrates the downstream frame with N time slots per frame. The frame start time slot is always the first time slot. All other time slots in the frame are available for the AIU to transport time division multiplexed virtual connection. One of these virtual connection is the session connection for transporting MAC messages.

| slot # | AIU |
|---|---|
| 1 | [FS] |
| 2 | [VC] |
| 3 | [VC] |
| . | . |
| . | . |
| . | . |
| N | [VC] |

4.3.2.4 Upstream Time Slots

Poll Time Slots

The poll time slots [P] are the time slots in the upstream frame that are allocated to only one NIU and may only be utilized for a poll response after receiving a poll request from the AIU in the frame start cell. The poll time slots may only encapsulate an OAM cell whose payload shall only be MAC messages defined in this document.
Contention Time Slots The contention time slots [C] are the time slots in the upstream frame that may be allocated to more than one NIU and, thus, utilizing the contention time slot may cause a collision with another NIU utilizing the same contention time slot. If a collision occurs, then the contention must be resolved via any number of well-known algorithms implemented in the NIU, such as random retransmission delays based on the niu_id, to determine how many frames the NIU shall wait before retransmission. The minimum and maximum time before retransmission on the contention time slots are configuration items that may be sent to the NIU during net entry or any time after that based on system usage. The contention time slots may only encapsulate an OAM cell whose payload shall only be MAC messages defined in this document.

Reserved Time Slots

The reserved time slots [VC] are the time slots in the upstream frame that are allocated to only one NIU, i.e. they are reserved for use by one NIU. The NIU may transmit on any of these time slots whenever it has any cells that need to be transmitted to the AIU. The cells may be OAM cells or part of and adaptation layer packet, e.g. AAL5. The reserved time slots are reference by the symbol VC because they are utilized in a more true ATM sense rather than being synchronous or semi-synchronous due to physical layer constraints and because these are the only upstream time slots on which higher layer cells may be transmitted on a virtual connection.

4.3.3 Message Structure and Message Types

The MAC messages all utilize the same basic structure as outlined below. Every message consists of the fields: niu_id, msg_type, num_msg_items, and a list of the msg_items. Each message item table in this document describes the fields for the message items of the type designated by one of the message types in the message type table. The message header, i.e. the niu_id, msg_type, and num_msg_items is not shown in these tables. Only one instance of the fields for a single item in the msg_items field of the message is given in each message item table. If in the message header the number of message items is greater than one, the message will contains more than one instance of the message item. All message fields are unsigned unless otherwise stated. The type of each field is sufficiently defined by the following message item tables in this document.

| msg( ) | Bits | Bytes | Bit Number/Description |
|---|---|---|---|
| { | | | |
| niu_id | 16 | 2 | |
| msg_type | 8 | 1 | Identifies the message type |

| | | | -continued |
|---|---|---|---|
| num_msg_items | 8 | 1 | # of message items being sent |
| msg_items | | | Variable Length |
| } | | | |

The niu_id is a unique identifier of a specific NIU in the polling list of NIU's for a group of downstream and corresponding group of upstream frequency channels on which the NIU may receive and transmit, respectivity. An niu_id= $FFFF is used to indicate all NIU's, i.e. it is the "multi-cast" ID. The VC header may direct this message to only one NIU or may broadcast the message.

The mgs_type is one of the messages in the msg_type table. The num_msgs_items is the number of items of the designated message type that are in the given instantiation of the message. The mag_items is the list of times of the type designated by the msg_type.

The following message type table lists the types of MAC messages in the order that they shall be enumerated. Any message types added to this table in the future must be added at the end of the enumeration list. In the message type table, the slot type indicates the type of time slot in which the message of that type would most likely be encapsulated.

| msg_type | Slot Type | Delivery | Description |
|---|---|---|---|
| reserved_slot_request | [C] | AIU<-NIU/STB | NIU request for reserved time slots. |
| reserved_slot_allocation | [FS,VC] | AIU->NIU/STB | Allocation/deallocation of reserved time slots. |
| contention_slot_allocation | [FS,VC] | AIU->NIU/STB | Allocation/deallocation of contention time slots. |
| poll_slot_allocation | [FS,VC] | AIU->NIU/STB | Allocation/deallocation of polled time slots. |
| net_entry_msg | [FS] | AIU->NIU/STB | Parameters for an NIU to enter the network. |
| tx_calibration | [FS,VC] | AIU->NIU/STB | NIU transmit freq, power, time corrections. |
| status_request | [FS] | AIU->NIU/STB | Request specified NIU status items. |
| status_response | [P] | AIU<-NIU/STB | Requested NIU status items. |
| configuration | [VC] | AIU->NIU/STB | Several NIU configuration items. |
| configuration_ack | [VC] | AIU<-NIU/STB | Acknowledgment of receipt of config items. |
| session_request | [C] | AIU<-NIU/STB | NIU request a session/control connection. |
| session_connection | [FS,VC] | AIU->NIU/STB | AIU assigns VP/NCI for session connection. |
| session_release | [VC] | AIU<>NIU/STB | AIU or NIU releases a session connection. |
| session_msg_ack | [FS,VC,C] | AIU<>NIU/STB | Acknowledgment of receipt of the 3 above msgs. |
| new_downstream_channel | [VC] | AIU->NIU/STB | Command NIU to enter net on new channel. |

4.3.4 Idle Cell

The NIU shall transmit on every reserved time slot. If no data is available, an idle cell as defined by the ATM Forum shall be transmitted. The AIU may deallocate reserved time slots for an NIU that is not utilizing the reserved time slots for data. The idle cells may be used to determine upstream transmit signal calibration corrections, upstream BERR, reserved time slot utilization, and NIU acknowledgment of reserved time slot allocation/deallocation.

4.3.5 Upstream Time Slot Allocation

The MAC upstream time slot allocation scenario depicts how reserved, contention, and polled time slots for transmitting upstream from the NIU are allocated and deallocated. The only difference in the scenario for each of the different type of time slots is that reserved time slots may be requested by the NIU. The contention and polled time slots are never requested by the NIU. The AIU decides which upstream frequency channels and time slots of those channels should be allocated to each NIU as a contention or polled time slot. The reserved time slot allocation differs from the contention and polled time slot allocation in that the NIU may request reserved time slots. However, the reserved times slots, like the contention and polled time slots, may be allocated by the AIU without a request from the NIU. The time slot allocation messages may be sent as an update of a previously sent message rather than a change of allocation. This is shown in the scenario. The three types of time slot allocation messages are also similar in structure. Each is designated by a different message type but the fields are identical.

an NIU. Contention time slots may not be used for user traffic. If upstream traffic is mostly bursty data traffic, then contention time slot demand for time slot requests may be high. The AIU does not need to inform the NIU's that a contention slot is busy. If multiple handshakes are required in order to complete a task, the AIU may do so in a controlled manner. A VC could be used or, if the handshake rate is slow, the NIU could be polled to tell it when to respond.

poll_slot_allocation

The poll_slot_allocation message changes or updates the allocation of upstream polling response time slots of ran

| reserved_slot_request( ) [C] | Bits | Bytes | Bit Number/Description |
|---|---|---|---|
| { | | | |
|   num_time_slots | 8 | 1 | |
|   min_VBR_packet_size | 16 | 2 | number of 48 byte cell payloads |
| } | | | |
| reserved_slot_allocation( ) [VC] | Bits | Bytes | Bit Number/Description |
| { | | | |
|   time_slot_allocation | | | |
| } | | | |
| contention_slot_allocation( ) [VC] | Bits | Bytes | Bit Number/Description |
| { | | | |
|   time_slot_allocation | | | |
| } | | | |
| poll_slot_allocation( ) [VC] | Bits | Bytes | Bit Number/Description |
| { | | | |
|   poll_frame_delay | 8 | 1 | 1 to 256 frames |
|   time_slot_allocation | | | |
| } | | | |
| time_slot_allocation( ) [VC] | Bits | Bytes | Bit Number/Description |
| { | | | |
|   upstream_channel_num | 4 | 1 | |
|   time_slot_page | 4 | | |
|   is_change | 1 | 1 | MSB, 0=update, 1=change |
|   num_time_slots | 7 | | 7 LSB |
|   time_slot_list | 8per | 1per | pos=allocate, neg=deallocate |
| } | | | | reserved_slot_request

When the NIU determines that it needs more reserved time slots for user traffic, it requests more slots. The AIU decides how many reserved time slots to allocate to the NIU. If the NIU still needs more reserved time slots, it will send another reserved slot request to the AIU. The NIU may send in this message the number of time slots that it believes that it needs or always set the num_time_slots field to 1. The min_VBR_packet_size is the number of cells that are buffered at the NIU awaiting upstream transmission. Note that a cell in this case is considered to be 48-bytes.

reserved_slot_allocation

The reserved_slot_allocation message changes or updates the allocation of upstream reserved time slots for an NIU. The reserved time slots are the only time slots that may be used for user traffic. The NIU shall transmit an idle message cell on every reserved time slot for which the NIU does not have any data ready to transmit. After the NIU is initially calibrated and is allocated reserved time slots, the calibration correction parameters for the signal transmitted upstream from the NIU may be determined from the receipt of the reserved time slots.

contention_slot_allocation

The contentions_slot_allocation message changes or updates the allocation of upstream contention time slots for NIU. Guard time slots are not allocated in the poll time slot allocation. The poll_frame_delay is the number of upstream frames that the poll response shall be delayed. A delay of 1 frame means that the poll response is transmitted on the first allocated polling response time slot after the NIU has transmitted the first time slot of the upstream frame and, then, the last time slot of the frame. A poll_frame_delay of zero is invalid. The minimum of 1 frame limits the required response time for the NIU.

time_slot_allocation

The time_slot_allocation message may be used to change or to update the allocation of any type of upstream time slots for an NIU. Each time slot is referenced by frequency channel and time slot page such that a single time slot is a single element in a 2-dimensional array. The upstream_channel_num designates the upstream frequency channel number where 0 indicates the lowest channel based on frequency and 15 indicates the highest channel based on frequency. The time_slot_page designates the group of 128 times slot where 0 indicates times slots 0 through 127 and 1 indicates time slots 128 through 255. The is_change bit indicates whether this message in allocating or deallocating time slots on the stated page of the frequency channel or is only an update which lists the time slots that are currently allocated for the NIU. Num_time_slots in the number of time slots from 0 to 127 that are in the following list for the channel and page. The time_slot_list is a list of numbers that correspond to each time slot on the page. The first time slot is referred to a 0, and the last time slot on the page is referred to as 127. If the time slot number is positive, i.e. the MSB is cleared, then the time slot is allocated. If the time slot number is negative, i.e. the MSG is set, then the time slot is deallocated.

Example Upstream Time Slot Allocation

The following figure illustrates two consecutive upstream frame with ten time slots per frame. In this example, assume that the three NIU's transmit on only one upstream frequency channel and that the channel is the same for all three. A possible allocation of the three types of upstream time slots at an instant in time is shown. The polling response time slot is slot number one for all three NIU's. In this case, time slots 2 and 3 are not allocated and, thus, can be guard time slots. That is, if NIU #1 transmits late and actually the polling response is received at the AIU during time slot number 2, then the polling response does not interfere with any time slots allocated to other NIU's. Also, note that NIU #4 has not entered the network yet and, thus, has not yet been allocated any time slots other than the polling response time slot that is to be used for network entry.

TABLE 8

Example Upstream Time Slot Allocation

| slot# | NIU #1 | NIU #2 | NIU #3 | NIU #4 |
|---|---|---|---|---|
| 1 | [P] | [P] | [P] | [P] |
| 2 | | | | |
| 3 | | | | |
| 4 | [C] | [C] | [C] | |
| 5 | | | [C] | |
| 6 | | [C] | [C] | |
| 7 | | | [VC] | |
| 8 | | [VC] | | |
| 9 | | | [VC] | |
| 10 | | | [VC] | |
| 1 | [P] | [P] | [P] | [P] |
| 2 | | | | |
| 3 | | | | |
| 4 | [C] | [C] | [C] | |
| 5 | | | [C] | |
| 6 | | [C] | [C] | |
| 7 | | | [VC] | |
| 8 | | [VC] | | |
| 9 | | | [VC] | |
| 10 | | | [VC] | |

4.3.6 Polling Handshake

Figure 11:
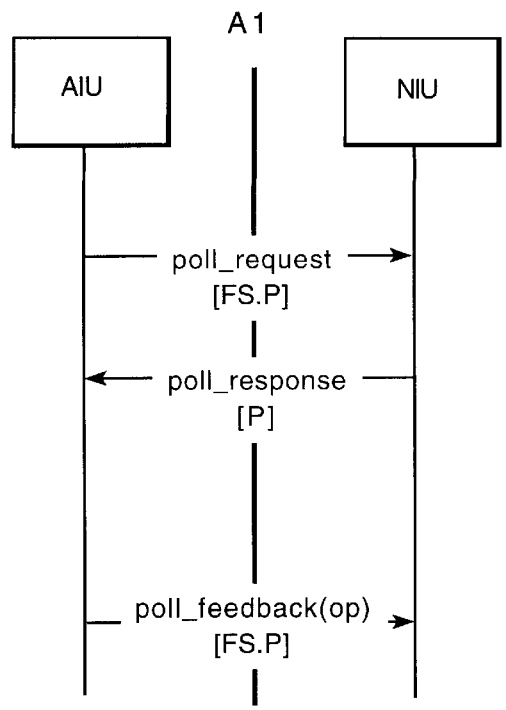
FIG. 11 illustrates the polling handshake.

FIG. 11 illustrates the polling handshake. The NIU shall be polled periodically to establish communication and maintain communication with the NIU. If no other messages are flowing from the AIU to the NIU, the AIU shall poll each NIU assigned to that AIU at an interval of less than or equal to 2 seconds. This is for proper upstream transmit signal calibration and to facilitate network entry both before the NIU has determined which downstream frequency is polling it and while waiting for configuration. The polling handshake is initiated by the AIU with a poll_request in the frame start cell. The NIU responds on the upstream polling time slot that the AIU has allocated to the NIU. If the most recent poll request from the AIU does not include a poll_slots_allocation message in the frame start time slot poll_request field, the NIU shall assume that the time slots allocated for the polling response is the same as indicated in the previous poll_slots_allocation message that it received from the AIU. If more than one time slot in a time period is allocated for polling, the NUI shall respond on the earliest time slot in the frame. If the NIU is not aligned in time, the NIU's response may be received at the AIU during the time slots following the desired polling response time slot. Guard time slots must not be allocated by the AIU as reserved, contention or poll time slot for any NIU if the current NIU being polled is not time aligned. Only 1 polling time slot may need to be allocated otherwise. The guard time slots must follow the poll time slot. Also, the NIU must attempt to respond on the first time slot in order to do timing calculations. Polling of the NIU's that have not been calibrated, i.e. are entering the net, should be done consecutively so that the head-end can allocate the guard time slots for contention usage for the longest amount of time. The polling handshake may include a third message refereed as poll_feedback. Some of the types of messages included as a poll_request are poll_slot_allocation, status_request, and serial_no. The poll_response may be a status_response message. Tx_calibration is a type of message that may be included as poll_feedback. The NIU shall implement a poll response delay of a minimum of one frame. This parameter is included in the poll_slot_allocation message.

If the NIU/STB losses power, it may remember the assigned niu_id and resources, i.e. connections and time slots. If the NIU remembers its niu_id, it responds to messages from the AIU using that niu_id. Otherwise, the NIU must wait to receive a serial number message. If the NIU does not remember its allocated resources, then it must not remember its niu_id, so that the lack of response to the niu_id indicates to the AIU that the resources allocated to the NIU is no longer valid for that NIU and should be released. The AIU shall declare that the NIU is not responding if the AIU has not received a response to a polling request for 10 seconds. Note that this assumes that the AIU is polling the NIU a minimum of every 2 seconds as stated in this document. If the lack of NIU response or lack of receipt of the response at the AIU is due to a loss of communication versus a loss of power, then this 10 seconds interval accommodates most periods of communication loss. If, however, a communication loss is sustained for a period longer than 10 seconds, then the AIU shall a transmit a serial number message to the NIU with a different niu_id. The association of a new niu_id with the serial number indicates to the NIU that the AIU has lost communication with the NIU and, thus, that the AIU has released the allocated resources for that NIU, and the NIU shall release its allocated resources. The AIU shall not transmit a new niu_id for an NIU via the serial number message unless the AIU is releasing all the resources allocated for that NIU. For every new niu_id, the NIU shall perform the network entry process again. During a temporary communication loss, the NIU is not calibrated on the specified interval. Therefore, when communication is reestablished, the NIU may be unsatisfactorily calibrated such that the AIU must account for this.

The table 9 shows that many more downstream cells are transmitted for every upstream cell. The downstream frame start cell is indicated by the shaded time slot. To the left of the downstream frame is an indication of which NIU is polled in the downstream frame start. Refer to the allocation of upstream time slots in the *Example Upstream Time Slot Allocation* in the *Time Slot Allocation* section of this document. The allocation of time slots in the allocation example is assumed in this example. Note that NIU #4 has not entered the network yet and, thus, its upstream transmit signal has not yet been calibrated. Thus, the polling response from NIU

4 is received on later time slots at the AIU than is allocated for NIU #4's polling response time slot. Also, note that the polling response by the NIU's are delayed by one upstream frame after the polling request is received. Furthermore, the upstream frame is received with an offset delay due to a constant path length difference between NIU's. So long as that different is a constant, and does not vary between NIU's that may access the same upstream frame or frames, then this offset has no impact other than a delay.

TABLE 9

Example Polling Response Frame Delay

| Downstream | slot | Upstream |
|---|---|---|
| [FS] Poll | 5 | NIU #3 [C] |
|  | 6 | NIU #1 [C] |
|  | 7 | NIU #3 |
|  | 8 | NIU #2 |
|  | 9 | NIU #3 |
|  | 10 | NIU #3 |
|  | 1 | [P] |
|  | 2 |  |
|  | 3 |  |
|  | 4 |  |
| [FS] Poll NIU | 5 |  |
|  | 6 |  |
|  | 7 | NIU #3 |
|  | 8 | NIU #2 |
|  | 9 | NIU #3 |
|  | 10 | NIU #3 |
|  | 1 | NIU #1 [P] |
|  | 2 |  |
|  | 3 |  |
|  | 4 | NIU #3 [C] |
| [FS] Poll NIU | 5 |  |
|  | 6 | NIU #2 [C] |
|  | 7 | NIU #3 |
|  | 8 | NIU #2 |
|  | 9 | NIU #3 |
|  | 10 | NIU #3 |
|  | 1 | NIU #2 [P] |
|  | 2 |  |
|  | 3 |  |
|  | 4 | NIU #1 [C] |
| [FS] Poll NIU | 5 |  |
|  | 6 |  |
|  | 7 | NIU #3 |
|  | 8 | NIU #2 |
|  | 9 | NIU #3 |
|  | 10 | NIU #3 |
|  | 1 | NIU #3 [P] |
|  | 2 |  |
|  | 3 |  |
|  | 4 | NIU #1, 2 |
| [FS] Poll NIU | 5 | NIU #3 [C] |
|  | 6 | NIU #1 [C] |
|  | 7 | NIU #3 |
|  | 8 | NIU #2 |
|  | 9 | NIU #3 |
|  | 10 | NIU #3 |
|  | 1 |  |
|  | 2 | NIU #4 [P] |
|  | 3 |  |
|  | 4 |  |
| [FS] Poll NIU | 5 |  |
|  | 6 |  |
|  | 7 | NIU #3 |
|  | 8 | NIU #2 |

| status_request( ) [FS.P] | Bits | Bytes | Bit Number/Description |
|---|---|---|---|
| { |  |  |  |
| niu_tx_power |  |  | dBm |
| niu_rx_power |  |  | dBm |
| current_state (of X module) |  |  |  |
| is_ok (X module) |  |  |  |
| etc. |  |  |  |
| } |  |  |  |
| status_reponse( ) [FS.P] | Bits | Bytes | Bit Number/Description |
| { |  |  |  |
| niu_tx_power |  |  | dBm |
| niu_rx_power |  |  | dBm |
| current_state (of X module) |  |  |  |
| is_ok (X module) |  |  |  |
| etc. |  |  |  |
| } |  |  |  |
| tx_calibration( ) [FS.P] | Bits | Bytes | Bit Number/Description |
| { |  |  |  |
| freq_correction | 8 | 1 | 1 kHz |
| time_correction | 16 | 2 | 5 downstream moduluation symbol |
| power_correction | 8 | 1 | .2dB. |
| } |  |  |  | status request

This is a list of the status items requested from the NIU. Most of the status is acquired via a VC for management.

status response

This is a list of the status items that were requested by AIU.

tx calibration

Figure 12:
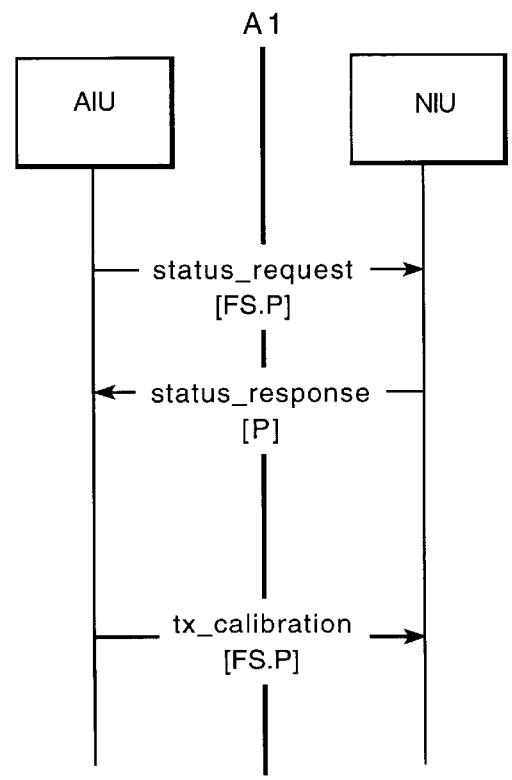
FIG. 12 illustrates the polling handshake-upstream signal calibration, FIG. 13 diagrams the network entry.

FIG. 12 illustrates the polling Handshake-upstream signal calibration.

The corrections for the upstream transmit signal from the NIU are sent in this message. The frequency correction is a signed integer with a resolution of 10 kHz where a positive value indicates that the NIU should increase its frequency, and a negative value indicates that the NIU should decrease its transmit frequency. The time correction is a signed integer with a resolution of a 0.5 downstream modulation symbol which equals 1 downstream sample clock period where a positive value indicates that the NIU should delay its transmit, and a negative value indicates that the NIU should transmit sooner. The power correction is a signed integer with a resolution of 2 tenths of a dB where a positive value indicates that the NIU should lower it transmit power. In addition to these power corrections from the AIU, the NIU shall implement an automatic transmit power correction algorithm based on the downstream received signal. Poll requests do not need to be sent in order to determine the NIU's transmit signal corrections. This would be possible if the head-end is capable of determining timeing, etc. adjustments from traffic time slots. Using a VC for the calibration message sent to the NIU wastes bandwidth since the information is small and infrequent enough such that it may be sent in the frame start time slot.

4.3.7 Network Entry

Figure 13:
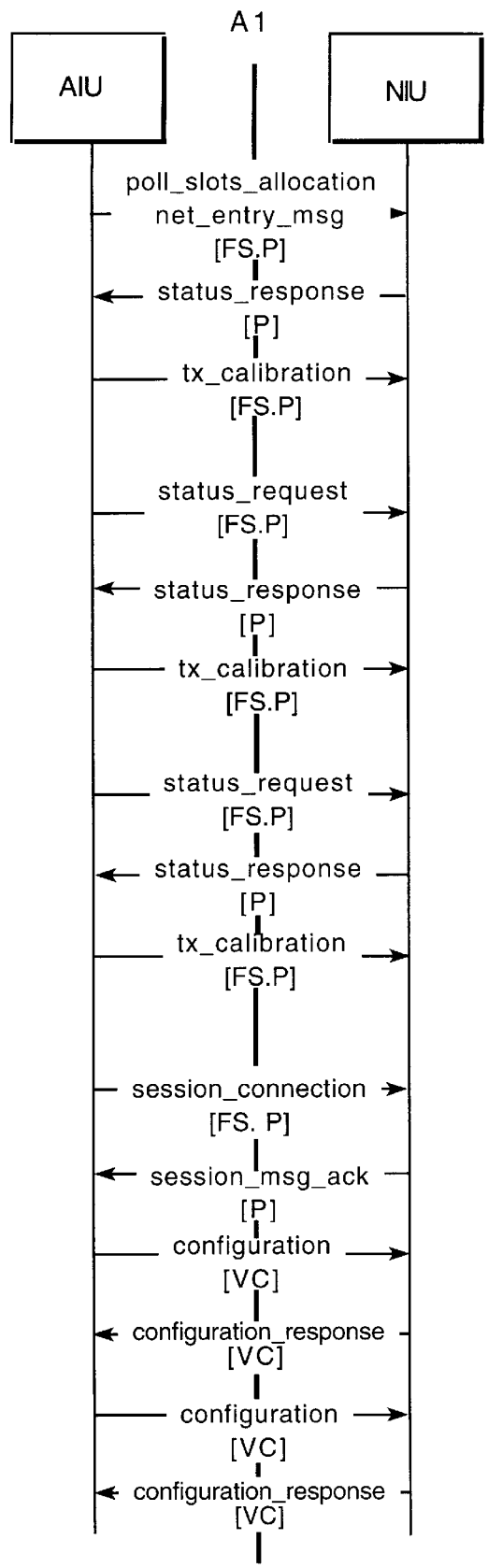

FIG. 13 illustrates the network entry.

The AIU polls each of the NIU's on at least one of the downstream frequency channels in a group. Before the NIU enters the network, it may be polled on more than one downstream frequency channel from different channel groups, and a different niu_id may be used for each group. When the NIU attempts to enter the network, it acquires a downstream frequency channel and listens for the poll directed to it. Since the NIU has not entered the network, in order for the NIU to recognize that the poll is directed to it, the AIU sends the NIU's partial or full serial number along with the niu_id in the polling request message. One NIU may be polled more than once before another NIU is polled, so long as no other requirements for are being violated. Since polls are not necessarily round robin, an NIU is not able to wait till the same niu_id comes around twice to in order to determine that it is not being polled on that downstream channel. Each NIU's transmit signal must be corrected on a regular basis, but a poll request message is not necessary in order to send a transmit calibration message to the NIU. The transmit calibration message must be sent at least once every 2 seconds worst case. The NIU shall not be decalibrated so much between corrections such that it interferes with other NIU's. (See the physical requirements.) All NIU's that have not entered the network but are assigned to be polled on the downstream frequency will be polled on that downstream frequency channel no less frequent than 2 seconds.

If the NIU waits 2 seconds, but does not receive its serial number, it will acquire the next downstream frequency and net_entry_msg The net_entry_msg has two parts, the serial_no, which indicates to the NIU that it is assigned to the downstream frequency channel that is transmitting this message, and the upstream_signal_config, which is used by the NIU to configure it upstream transmitted signal. The num_serial_no_bytes field indicates the number of bytes in the serial_no, or least-significant bytes of the serial number, are in this message. The maximum number of bytes is 20. The symbol rate ratio is the ratio of downstream modulation symbols to upstream modulation symbols. Note that this is always an integer. This ratio is used by the NIU to set the upstream data rate. the upstream_frame_delay is the number of upstream time slots to delay the start of the upstream frame from receipt of the downstream frame start cell header.

4.3.8 Configuration

| configuration( ) [VC] - OAM | Bits | Bytes | Bit Number/Description |
|---|---|---|---|
| { | | | |
| configuration_item_id | 16 | 2 | |
| configuration_value | | 1-n | Depends on the item being configured |
| } | | | |
| configuration_ack( ) [VC] - OAM | Bits | Bytes | Bit Number/Description |
| { | | | |
| configuration_message_received | 1 | 1 | Bit 0: 1 = Message Received 0 = Message needs to be resent |
| configuration_accepted | 1 | 1 | Bit 1: 1 = Message accepted 0 = Message conflicts with other configuration parameters |
| } | | | | again listen for its serial number. This process repeats until the NIU finds a downstream frequency channel on which it is being polled. Once the NIU finds its poll and, then, responds to the poll, the NIU is only polled by this one downstream frequency channel.

So that the poll response time slot sent by the NIU does not interfere with adjacent upstream time slots during the initial polling handshakes, at least one guard time slot must follow the NIU poll response time slot until the NIU transmit signal is sufficiently time aligned. Once the NIU is calibrated, a connection for MAC control session is assigned and the security and configuration handshakes are executed. Once the NIU is configured, it goes into "Standby". "Standby" is characterized by lack of user activity. The AIU continues to poll the NIU while it is in "Standby" to maintain upstream transmit signal calibration.

| net_entry_msg( ) [FS.P] | Bits | Bytes | Bit Number/Description |
|---|---|---|---|
| { | | | |
| serial_no | | | |
| num_serial_no_bytes | 8 | 1 | |
| serial_no_bytes | | <=20 | MS-byte first |
| upstream_signal_config | | | |
| symbol_rate_ratio | 8 | 1 | |
| upstream_frame_delay | 16 | 2 | Upstream time slots. |
| } | | | | configuration

The configuration message is used by the AIU to send configuration parameters to the NIU/STB. The configuration message is sent asynchronously to either an individual NIU, via the VC, or broadcast to all NIU's, via a broadcast VC. The AIU will assign a downstream broadcast VC during the AIU system startup. Whenever an NIU starts to enter the network, the AIU will will assign a VC to the NIU for status and configuration messages. The niu_id is a 16 bit value assigned to the NIU before net entry and subscriber authentication. The special value of −1 (0×FFFF) will be used to indicate all NIU's. The configuration message uses the standard message format with the niu_id, msg_type, and num_msg_items as the common part. The remainder of the message is structured to selectively set configuration items as needed. The num_msg_items which is the "num_configuration_items" indicates the number of items being set in this message, where each item is identified by its configuration_item_id. Each configuration item in turn requires a different number of bits or bytes for the value. Therefore, "configuration_value" can be from 1 to n (TBD) bytes.

configuration_ack

Every configuration message received by the NIU will have an acknowledgment sent back to the AIU. This message is sent upstream during one of the allocated reserved time slots. The acknowledgment will include both a message received and a configuration accepted response.

Configuration Items:
 1. Some contention cell assignments. (Current complete or partial list).
 2. Security "Key" or Security Item
 3. From NIU: Max # overhead cells/sec that is can handle.
 4. MAC Protocol Version—MIB
 5. Minimum and maximum transmit power level
 6. Upstream data bit rate
 7. Contention retry:
 Min time between contention retry or time slot request
 Max time for random contention retry
 Retry algorithm type
 8. Which upstream frame to respond to a poll. The start of the next upstream frame after the poll request is frame number 1.
 9. Upstream frame offset from start of downstream frame.
 10. Session message retry time-out (If don't get acknowledgment within some time) and number of retries

4.3.9 Session Connections

Figure 14:
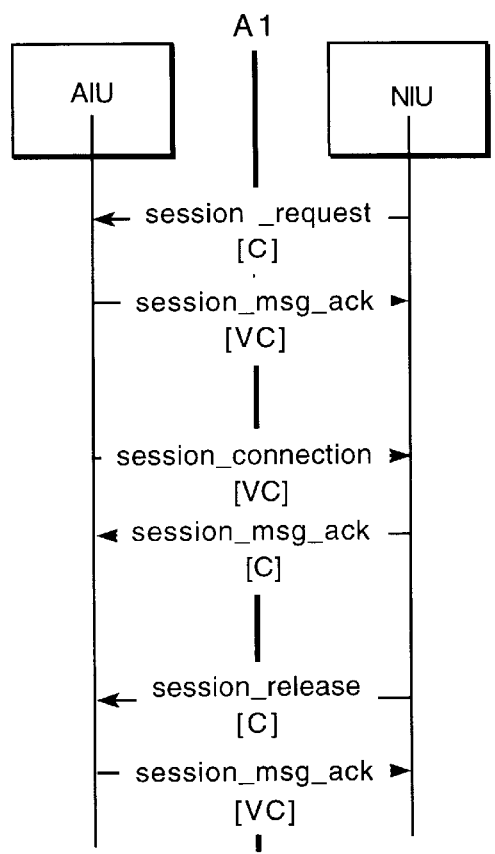
FIG. 14 illustrates the sessions connections.

FIG. 14 illustrates the session connections.

Session connections are ATM connections between the NIU and AIU that transport communication between two control entities or servers. The control entities may or may not reside in the NIU and AIU. It may be necessary that the connection assigned by this session_connection message be switched to other virtual connections one or more times to reach the control entity. In order to establish a session connection, it is not necessary that the NIU request a connection. The AIU may simply establish the connection by sending a session_connection message to the NIU. This is the case for control and management session connections. The MAC session connection is a control session and is established by the AIU without a session_request message from the NIU. The first session connection that is established is for MAC session and is the MAC connection for transporting MAC messages in the downstream random access time slots and in the upstream reserved time slots. These time slots are referenced in this document by VC (Virtual Connection). Since the MAC session is the first session for which a connection is established, the niu_session_id is usually 0 for that connection. A management session connection is usually established next. The user data, video, and voice session connections are typically requested by the NIU when the STU requires a connection to transport control messages to a control entity or server at the AIU or beyond. If the session connection is for transporting ATM user data control messages, then the entity would be a Q.2931 entity. The STU would detect idle cells from an external ATM port and then invoke the NIU to request a session connection for anticipated Q.2931messages.

Due to the shared wireless physical media, assigning a different MAC session connection for each NIU alleviates the need for every NIU to process every MAC session connection cell to identify which cell payloads contain its niu_id. Furthermore, for other session connections, e.g. management and user data Q.2931, it is necessary that there be a different session connection so that these messages may be simply passed through to the NIU without appending an niu_id. If every NIU used 0/5 for Q.2931, there would be no way to tell to which NIU the Q.2931 messages were sent.

All session connection messages require an acknowledgment via the session_msg_ack message. A session_msg_ack message shall be sent by an NIU within 50 msecs from the time it receives the complete cell. A session_msg_ack message sent by an AIU to an NIU must be completely received by the NIU 100 msecs after the complete cell of the session message that needs acknowledgment is sent by the NIU. Any session message sent by the NIU or AIU that does not receive acknowledgment within the specified time shall immediately be resent. As long as the acknowledgment is the received, the session message shall be resent a minimum of 5 times. If the message becomes invalid during this process, the NIU and AIU shall complete this process with the original message before changing the session message sent.

| session_request( ) [C] | Bits | Bytes | Bit Number/Description |
|---|---|---|---|
| { | | | |
| niu_session_id | 16 | 2 | |
| session_type | 8 | 1 | 0 = MANAGEMENT |
| | | | 1 = CONTROL |
| | | | 2 = USER_DATA |
| | | | 3 = USER_VIDEO |
| | | | 4 = USER_VOICE |
| | | | 5–255 = reserved |
| } | | | |
| session_connection( ) [VC] | Bits | Bytes | Bit Number/Description |
| { | | | |
| niu_session_id | 16 | 2 | |
| VPI | 8 | 1 | |
| VCI | 16 | 2 | |
| } | | | |
| session_release( ) [VC or C] | Bits | Bytes | Bit Number/Description |
| { | | | |
| niu_session_id | 16 | 2 | |
| } | | | |
| session_msg_ack( ) [C] | Bits | Bytes | Bit Number/Description |
| { | | | |
| niu_session_id | 16 | 2 | |
| } | | | | session_request

A session_request message is to set-up a connection to a server or entity that can provide the control flow for that type of session. If a signaling connection for a type of session, e.g. data session, has been connected, then following signaling messages and connection data do not require a session_request message and handshake. The niu_session_id is a unique number for that session for the one NIU designated by the niu_id in the message header. The session_type indicates to the AIU to which server or entity the session control connection should be made.

session_connection

The session_connection specifies the VC, i.e. VPI/VCI, that the NIU must use for the requested session connection. A different control connection for signaling may bes assigned for each port of the STU for support of simultaneous signaling control flows from the same STU.

session_release

The session control connection is disconnected after it is no longer needed by the STU or can not longer be supported by the AIU. Session_release originates from either the AIU or the NIU/STB.

session_msg_ack

To ensure that session is provided within a reasonable or necessary time, as determined by the type of session, the session_msg_ack is sent in response to each of the session messages.

4.3.10 Sector Load Balance

```
new_downstream_channel( )   Bits   Bytes   Bit Number/Description
{
    downstream_channel_num   8      1
}
```

Figure 15:
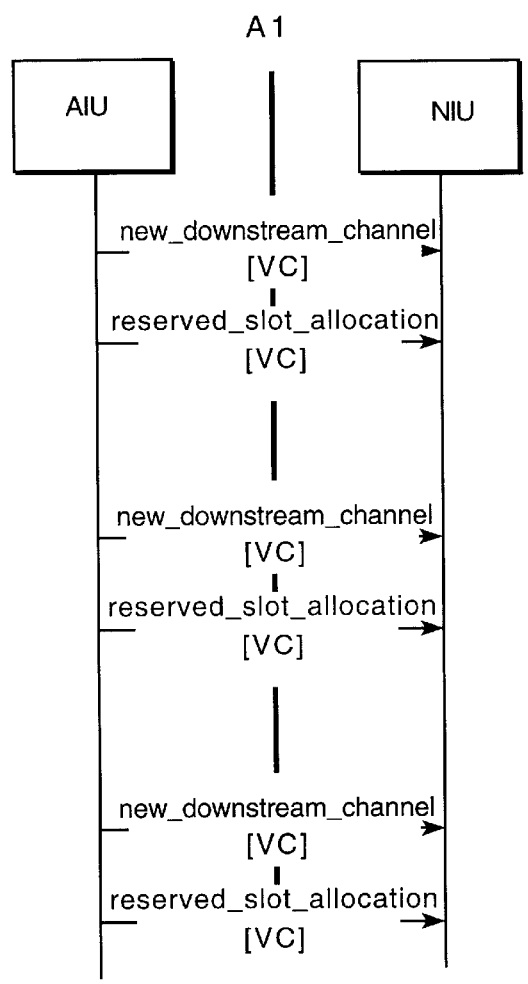
FIG. 15 illustrates the sector load balance, FIG. 16 diagrams the shared media connectivity to END station - LANE network.

FIG. 15 illustrates the sector load balance.

4.4 LAN Functionality

Figure 16:
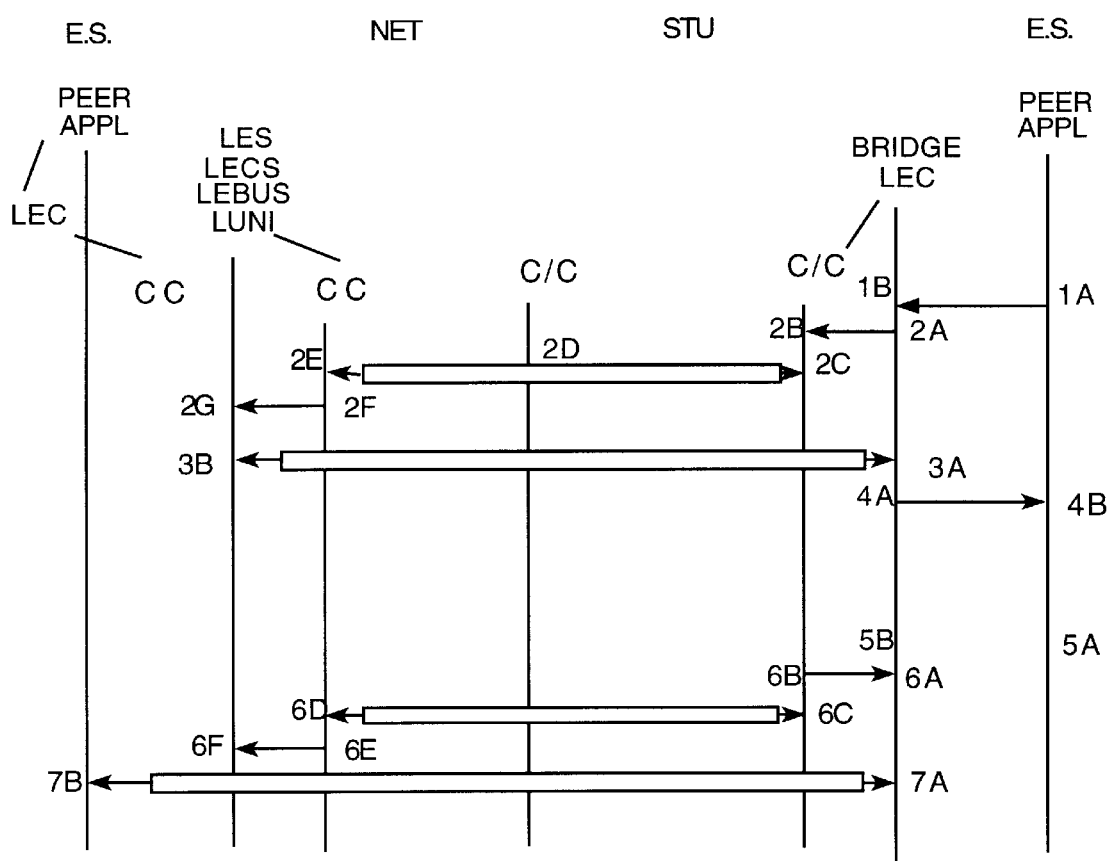

FIG. 16 illustrates the shared media connectivity to end station.

In this model, the End Station (E.S) employs a shared media interface such as Ethernet. The session entity within the STU includes a SAR function and an 802 MAC level bridge function which communicates with a LAN Emulation Client entity (LEC) located in the network. This LEC is compliant with ATM-Forum LANE standards. It is assumed that remote End Stations contain the required LANE servers and peer clients.

Understand that the internal operation of the E.S. is representative of typical operation. It is informative and provided to facilitate understanding of the normative portions.

TABLE 4-10

Shared Media Initialization Session & Call/Connection Establishment

| | |
|---|---|
| 1a–1b | The E.S peer application sends the first IP packet. The underlying stack on the E.S. sends an ARP packet to resolve the destination IP address to an 802 MAC address. The Bridge function in the STU session receives this request and triggers initialization with LEC in network. |
| 2a–2g | Bridge function establishes an SVC connection to LEC in network |
| 3a–3b | Bridge in STU and LEC in network communicate to resolve 802 MAC addresses. (See Note 1.) |
| 4a–4b | The LEC supplies an ARP response message to the bridge which forwards it to the E.S. This message includes the requested 802 MAC address. |
| 5a–5b | The first IP packet(s) from E.S. Application flow to the bridge and then via the existing connection (labeled 3a'-3b') to the LEC where 802 MAC address is translated to ATM address of distant end LEC. The LEC directs the bridge to establish a direct ATM connection between the bridge (SAR) and a distant LEC. At the same title the LEC may request additional information from LANE servers and may forward initial packets to LEBUS. |
| 6a-6f | The bridge requests and establishes a connection to the distant LEC |
| 7a-7b | IP packets flow bi-directionally from E.S. through bridge to destination LEC. |

Note 1:
The protocol between bridge and LEC is to be defined. Note also that the LEC may need to communicate with LANE servers. These may be co-located or require their own connections. This is defined by ATM Forum and considered outside the scope of this Section.

4.5 Hardware and Software Implementations

4.5.1 User Equipment

Figure 17:
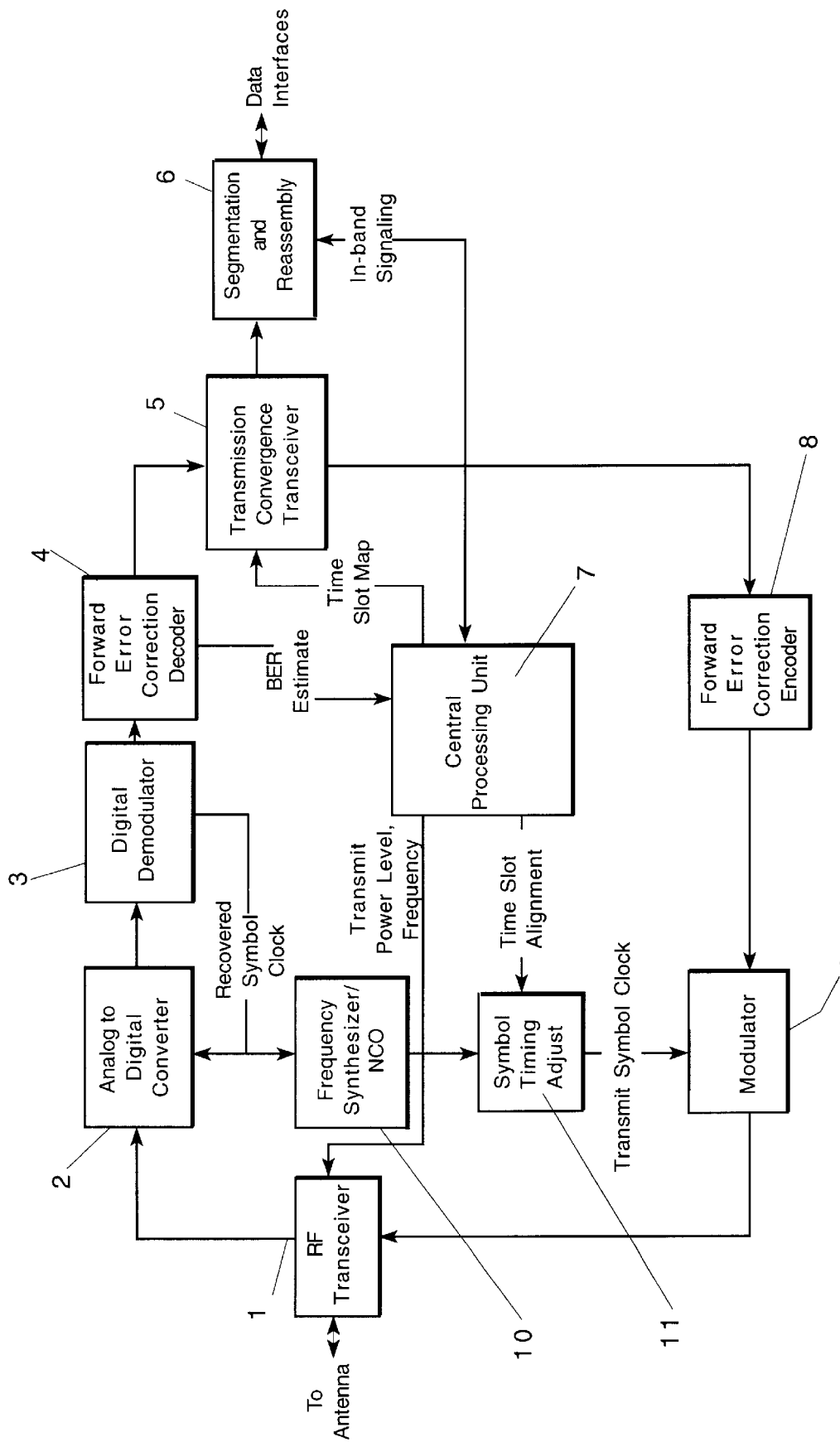
FIG. 17 is a block diagram of the architecture for user equipment.

FIG. 17 shows the block diagram for the subscriber equipment which implements the wireless network protocol. An RF transceiver (1) interfaces wtih the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The digital demodulator recovers the input signal symbol timing by controlling the phase fo the A/D converter sample clock via a data transition tracking loop fed back to a voltage-controlled oscillator (not shown for clarity). The digital demodulator also controls the gain in the downconverter stage of the RF transceiver via a gain control voltage. The forward error correction decoder performs convolutional decoding via the Viterbi algorithm and Reed-Solomon decoding and passes recovered ATM cells to the transmission convergence transceiver (5). The transmission convergence transceiver detects the frame start ATM cell and counts time slots within the frame to filter out ATM cells which are not intended for the user. ATM cells intended for the user are passed to the segmentation and reassembly (SAR) device (6) which constructs higher level packets to be passed to the data interfaces. In-band ATM signaling cells are passed directly to the central processing unit (7) which interprets the commands.

In the transmit direction, the central processing unit maintains a time slot map which is loaded into the transmission convergence transceiver. As higher level packets from the data interfaces are segmented into ATM cells, the transmission convergence transceiver loads them into the prescribed time slots of the upstream frame. In-band signaling cells, either session requests or responses to polling are passed from the central processing unit to the segmentation and reassembly device for insertion into the upstream frame.

Alternately, the transmission convergence transceiver can recognize and direct in-band signaling ATM cells to and from the central processing unit and bypass the SAR device. This would enable a physical layer only interface between the user equipment and other user premises equipment, since the SAR would not be performing segmentation and reassembly. Ultimately, the transmission convergence transceiver and the SAR may be combined into a single device.

ATM cells packaged onto the upstream frame are passed to the forward error correction encoder (8) which then sends the serial stream to the modulator (9) for modulation onto a carrier. The symbol timing of the modulator is coherently referenced to the recovered receive symbol timing via a frequency synthesizer or numerically controlled oscillator (NCO) (10). The symbol timing can be adjusted to ensure time slot alignment by a clock swallower circuit (11) or other means. The modulated signal is then frequency converted to the desired RF frequency by the RF transceiver. The output power level is controlled by the CPU from measurements of received power level from the AGC feedback from the digital demodulator to the RF transceiver and from the bit error rate estimator in the forward error correction device.

4.5.2 Base Station Equipment

Figure 18:
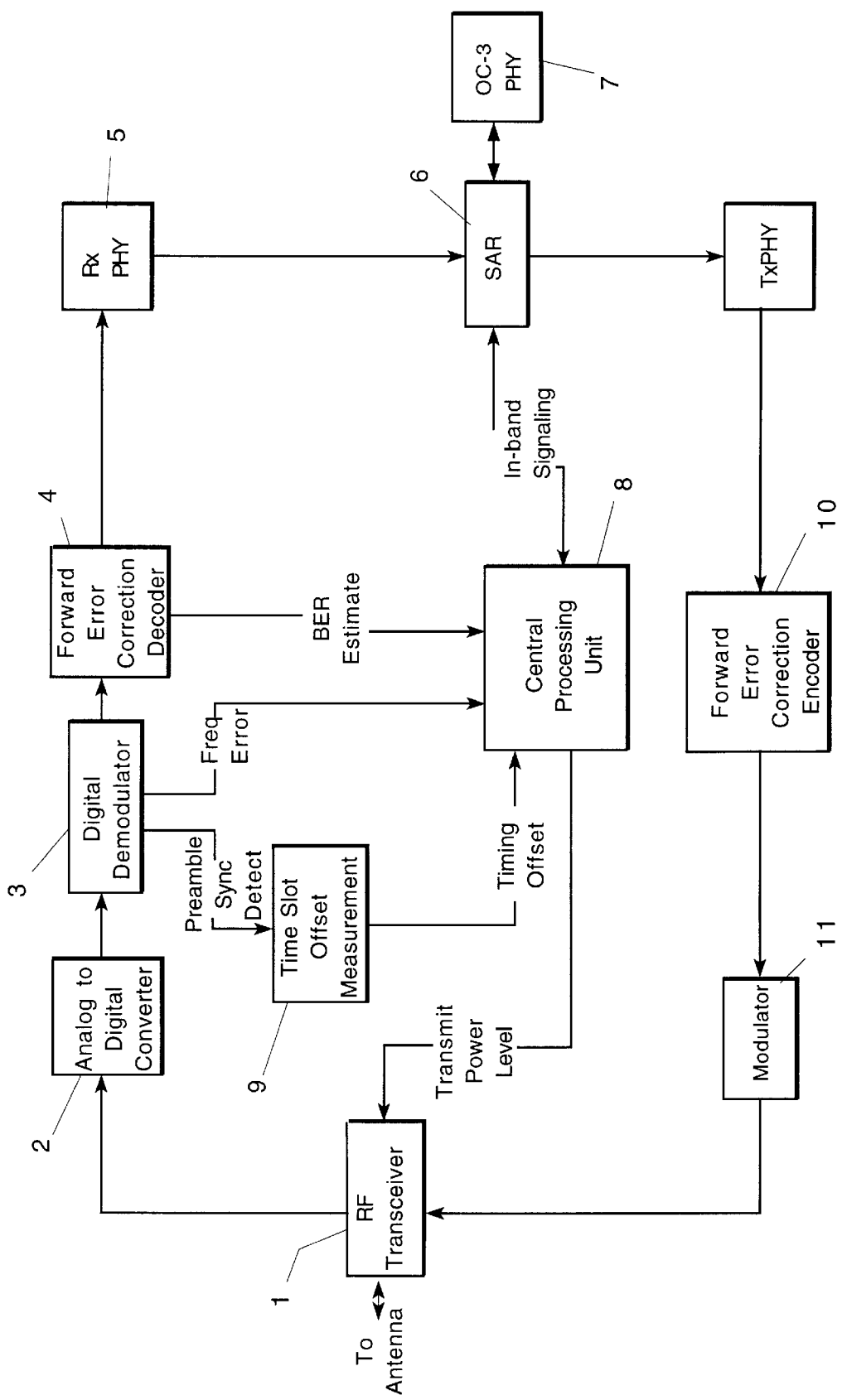
FIG. 18 is a block diagram of the architecture for base station equipment.

FIG. 18 shows the block diagram for the base station equipment. An RF transceiver (1) interfaces with the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The forward error correction decoder performs convolutional decoding via the Viterbi algorithm and Reed-Solomon decoding and passes recovered ATM cells to the ATM switch (5). The ATM switch may be implemented as a segmentation and reassembly ASIC, or as an external piece of equipment. In-band ATM signaling cells are passed directly to the central processing unit (6) which interprets the requests and polling responses.

When the base station polls a user for status and health, it will read the user's timing offset from the timing offset counter (7), and the user's frequency offset and signal level from the digital demodulator. Corrections to these are assembled into an in-band ATM cell and passed to the ATM switch for insertion into the downstream frame. Time slots in the downstream frames are filled with cells by the ATM switch according to typical scheduling functions of switches with the exception that the ATM switch inserts the frame start cell received from the central processing unit and exact intervals. The ATM cells are then forward error correction encoded (8) and modulated (9) to form the downstream RF. The RF transceiver upconverts the downstream signals to radio frequency. The central processing unit adjusts the transmit power level according to bit error rate measurements fed back from the subscriber to the hub station in the upstream network management polling response ATM cells.

5. VARIATIONS

The following variations should be obvious to the trained observer and are also claimed:

1. Use of alternate data rates resulting in a different number of time slots per frame.

2. Use of means other than ATM switch for routing in-bank signaling ATM cells to the CPU in the base station.

3. Use of means other than SAR device for routing in-band signaling ATM cells to the CPU in the user equipment.

4. Location of the contention cells and polling response cells within the upstream frame. Depending on processing capability, it may be advantageous to place the polling response time slot in the middle of the upstream frame, so that the subscriber can respond within the same frame period.

5. Use of alternate circuits for adjusting the user transmit time slot timing with respect to implementing a network protocol for wireless broadband-ISDN. Use of alternate circuits for unrelated applications is not claimed.

6. Other measures of received power level by the user equipment such as monitoring AGC settings, bit error rates prior to forward error correction decoding, etc.

What is claimed is:

1. In a networking protocol for wireless point (base station) to multipoint users network stations where each user is stationary and which utilizes time-division multiplexing in a downstream direction of the base station to the user, and time-division multiple access in the upstream direction of the user to the base station, with the stationary users being equipped with high gain directional antennas, the improvement comprising that means for providing transmission of a convergence layer wherein:
   a) time-division multiplexing is performed on an ATM cell basis in the downstream direction of the base station to the user;
   b) time-division multiple access on an ATM cell basis is used in the upstream direction of the user to the base station;
   c) upstream frame timing is synchronized to the downstream frame timing, where the first time slot of the downstream frame carries a Frame Start ATM cell which is an OAM cell identified by a unique reserved VPI/VCI;
   d) frame periods in both the upstream and downstream directions are approximately but not greater than six milliseconds in length to allow delivery of voice traffic with minimum latency.

2. In a networking protocol for wireless point (base station) to multipoint users network stations where each user is stationary and which utilizes time-division multiplexing in a downstream direction of the base station to the user, and time-division multiple access in the upstream direction of the user to the base station, with the stationary users being equipped with high gain directional antennas, the improvement comprising that means for providing transmission of a convergence layer wherein:
   a) time-division multiplexing is performed on an ATM cell basis in the downstream direction of the base station to the user;
   b) time-division multiple access on an ATM cell basis is used in the upstream direction of the user to the base station;
   c) upstream frame timing is synchronized to the downstream frame timing, where the first time slot of the downstream frame carries a Frame Start ATM cell which is an OAM cell identified by a unique reserved VPI/VCI;
   d) frame periods in both the upstream and downstream directions are approximately but not greater than six milliseconds in length to allow delivery of voice traffic with minimum latency, and further characterized in that means are provided for physical medium dependent layer wherein:
   a) the downstream is continuous-carrier with $\alpha=0.23$ root-raised cosine filtering, with QPSK or alternately 16 QAM or 64 QAM modulation, using concatenated forward error correction coding consisting of a (243, 213, t=15) Reed-Solomon over GF (256) operating on four ATM cells and rate 7/8 convolutional code,
   b) the upstream is burst-mode with $\alpha=0.23$ root raised cosine filtering, with QPSK or alternately 16 QAM modulation, using forward error correction of a (75, 53, t=11) Reed-Solomon code over GF(256).
   c) time slots in the upstream direction have five preamble bytes, one ATM cell, and a one byte guard band.

3. In a networking protocol for wireless point (base station) to multipoint users station network where each user is stationary and which utilizes time-division multiplexing in a downstream direction of the base station to the user, and time-division multiple access in the upstream direction of the user to the base station, with the stationary users being equipped with high gain directional antennas, the improvement comprising that means for providing transmission of a convergence layer wherein:
   a) time-division multiplexing is performed on an ATM cell basis in the downstream direction of the base station to the user;
   b) time-division multiple access on an ATM cell basis is used in the upstream direction of the user to the base station;
   c) upstream frame timing is synchronized to the downstream frame timing, where the first time slot of the downstream frame carries a Frame Start ATM cell which is an OAM cell identified by a unique reserved VPI/VCI;

d) frame periods in both the upstream and downstream directions are approximately but not greater than six milliseconds in length to allow delivery of voice traffic with minimum latency, and further characterized by means for medium access control functions being provided through:
  a) in-band signaling through ATM cells with reserved VPI/VCIs so that the requirements for acquisition, demodulation, and forward error correction are uniform across the data, control, and management planes of the network protocol;
  b) transmission convergence layer medium access control which dynamically assigns the time slots in the upstream direction to accommodate varying demands for bandwidth by multiple users;
  c) contiguous time slots at the beginning of the upstream frame are used for entry into the network by users whose two-way range timing has not been resolved to avoid mutual interference, where users entering the network remain on net entry time slots until their timing is aligned;
  d) session requests are performed on a contention basis through contention time slots;
  e) carrying control plane acknowledgment of service requests in the payload of the frame start ATM cell in the downstream frame.

4. In a networking protocol for wireless point (base station) to multipoint users network stations where each user is stationary and which utilizes time-division multiplexing in a downstream direction of the base station to the user, and time-division multiple access in the upstream direction of the user to the base station, with the stationary users being equipped with high gain directional antennas, the improvement comprising that means for providing transmission of a convergence layer wherein:
  a) time-division multiplexing is performed on an ATM cell basis in the downstream didrection of the base station to the user;
  b) time-division multiple access on an ATM cell basis is used in the upstream direction of the user to the base
  c) upstream frame timing is synchronized to the downstream frame timing, where the first time slot of the downstream frame carries a Frame Start ATM cell which is an OAM cell identified by a unique reserved VPI/VCI;
  d) frame periods in both the upstream and downstream directions are approximately but not greater than six milliseconds in length to allow delivery of voice traffic with minimum latency, and further characterized in that means are provided for management plane functions through:
  a) in-band signaling through ATM cells with reserved VPI/VCIs so that the requirements for acquisition, demodulation, and forward error correction are uniform across data, control, and management planes of the network protocol;
  b) polling users by the base station, with uses responding on dedicated time slots in an upstream frame;
  c) carrying management plane polling requests in the payload of the frame start ATM cell in an downstream frame carries,
  d) upstream time slot synchronization is maintained to within ±2 modulation symbols through timing control from the base station to the user and through slaving the user transmit symbol clock to its received symbol clock in the transmission convergence layer,
  e) upstream poser control is employed to ensure adequate received signal strength at the base station while minimizing adjacent cell interference.

5. In a networking protocol for wireless point base station to multipoint users network stations where the base station has a central processing unit each user is stationary and which utilizes time-division multiplexing in a downstream directon of the base station to the user, and time-division multiple access in the upstream direction of the user to the base station, with the stationary users being equipped with high gain directional antennas, the improvement comprising that means for providing transmission of a convergence layer wherein:
  a) time-division multiplexing is performed on an ATM cel basis in the downstream direction of the base station to the user;
  b) time-division multiple access on an ATM cell basis is used in the upstream direction of the user to the base station;
  c) upstream fram timing is synchronized to downstream frame timing, where the first time slot of downstream frames carries a Frame Start ATM cell which is an OAM cell identified by a unique reserved VPI/VCI;
  d) frame periods in both the upstream and downstream directions are approximately but not greater than six milliseconds in length to allow delivery of voice traffic with minimum latency, and further characterized in each said base station including:
  a) means for routing of in-band signaling ATM cells by an ATM switching device to and from the central processing unit;
  b) means for measuring timing offsets by subscribers through counting periods of the referenced symbol clock from a master frame epoch to the detection of a Barker sequence of a received transmission from the user;
  c) means for measuring received signal level via bit error rate estimation for closed loop power control of a user transmitter.

6. In a networking protocol for wireless point (base station) to multipoint users network stations where each user is stationary and which utilizes time-division multiplexing in a downstream direction of the base station to the user, and time-division multiple access in the upstream direction of the user to the base station, with the stationary users being equipped with high gain directional antennas, the improvement comprising that means for providing transmission of a convergence layer wherein:
  a) time-division multiplexing is performed on an ATM cell basis in the downstream direction of the base station to the user;
  b) time-division multiple access on an ATM cell basis is used in the upstream direction of the user to the base station;
  c) upstream frame timing is synchronized to downstream frame timing, where the first time slot of a downstream frame carries a Frame Start ATM cell which is an OAM cell identified by a unique reserved VPI/VCI;
  d) frame periods in both the upstream and downstream directions are approximately but not greater than six milliseconds in length to allow delivery of voice traffic with minimum latency, and further characterized in that each user equipment includes:

a) means for routing in-band signaling ATM cells to and from an ATM switching or segmentation and reassembly device to the user equipment central processing unit;
b) means for adjusting transmitter power based on received power level and power control commands via in-band signaling ATM cells from the base station;
c) means for slaving a transmit symbol clock reference to the received symbol clock reference;
d) means for adjusting the transmit symbol clock timing to minimize interference to other users.

7. In a networking protocol for wireless point base station to multipoint users network stations where each user is stationary and which utilizes time-division multiplexing in a downstream direction of the base station to the user, and time-division multiple access in the upstream direction of the user to the base station, with each stationary user being equipped with high gain directional antennas, the improvement comprising that means for providing transmission of a convergence layer wherein:

a) time-division multiplexing is performed on an ATM cell basis in the downstream direction of the base station to the user;
b) time-division multiple access on an ATM cell basis is used in the upstream direction of the user to the base station;
c) upstream frame timing is synchronized to the downstream frame timing, where the first time slot of the downstream frame carries a Frame Start ATM cell which is an OAM cell identified by a unique reserved VPI/VCI;
d) frame periods in both the upstream and downstream directions are approximately but not greater than six milliseconds in length to allow delivery of voice traffic with minimum latency, and further characterized in having means for providing local area network functionality through a proxy local area network emulation client residing in the base station which performs signaling and address resolution for the users network station.

* * * * *